(12) United States Patent
Ebi

(10) Patent No.: US 8,605,310 B2
(45) Date of Patent: Dec. 10, 2013

(54) IMAGE PROCESSING APPARATUS AND PREVIEW DISPLAY METHOD

(75) Inventor: Yukari Ebi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1180 days.

(21) Appl. No.: 12/504,832

(22) Filed: Jul. 17, 2009

(65) Prior Publication Data

US 2010/0027059 A1   Feb. 4, 2010

(30) Foreign Application Priority Data

Jul. 30, 2008  (JP) ................................ 2008-196797

(51) Int. Cl.
| G06F 3/12 | (2006.01) |
| G06F 3/14 | (2006.01) |
| H04N 1/60 | (2006.01) |
| G06K 15/02 | (2006.01) |
| H04N 1/46 | (2006.01) |
| H04N 1/00 | (2006.01) |
| H04N 1/04 | (2006.01) |

(52) U.S. Cl.
USPC ......... 358/1.15; 358/1.9; 358/1.14; 358/1.16; 358/501; 358/505; 358/527; 358/537; 358/401; 358/474; 715/273; 715/274

(58) Field of Classification Search
None
See application file for complete search history.

(56) References Cited

U.S. PATENT DOCUMENTS

| 5,818,439 | A | * | 10/1998 | Nagasaka et al. | ................ | 725/87 |
| 6,281,983 | B1 | * | 8/2001 | Takahashi et al. | ............. | 358/1.2 |
| 7,720,348 | B2 | * | 5/2010 | Fujinami | ........................ | 386/230 |
| 2002/0054301 | A1 | * | 5/2002 | Iwai et al. | ........................ | 358/1.2 |
| 2002/0131086 | A1 | * | 9/2002 | Mori et al. | ..................... | 358/1.18 |
| 2003/0090717 | A1 | * | 5/2003 | Yoshida et al. | ............... | 358/1.15 |
| 2003/0103081 | A1 | * | 6/2003 | Ebuchi | ........................... | 345/764 |
| 2005/0089301 | A1 | * | 4/2005 | Sekiguchi | .......................... | 386/4 |
| 2005/0141016 | A1 | * | 6/2005 | Han | ............................... | 358/1.14 |
| 2006/0044593 | A1 | * | 3/2006 | Kawakami et al. | ........... | 358/1.14 |
| 2006/0221416 | A1 | * | 10/2006 | Yamada | ........................ | 358/527 |
| 2007/0121127 | A1 | | 5/2007 | Minowa et al. | | |
| 2007/0211296 | A1 | * | 9/2007 | Toda | ........................... | 358/1.18 |
| 2007/0229926 | A1 | * | 10/2007 | Morisaki et al. | ............... | 358/527 |
| 2008/0151294 | A1 | * | 6/2008 | Natori et al. | ................... | 358/1.15 |
| 2008/0304104 | A1 | * | 12/2008 | Hirama | ........................ | 358/1.15 |
| 2009/0027712 | A1 | * | 1/2009 | Sone | ............................ | 358/1.13 |

FOREIGN PATENT DOCUMENTS

| JP | 2002-112169 | * | 4/2002 | ................ H04N 5/91 |
| JP | 2003-177904 | * | 6/2003 | ................ G06F 3/12 |
| JP | 2005-136939 | * | 5/2005 | ................ H04N 1/00 |
| JP | 2006-171861 | | 6/2006 | |
| JP | 2006-331161 | * | 12/2006 | ................ G06F 3/12 |
| JP | 2007-150597 | | 6/2007 | |

* cited by examiner

Primary Examiner — King Poon
Assistant Examiner — Beniyam Menberu
(74) Attorney, Agent, or Firm — Edwards Wildman Palmer LLP; David G. Conlin; Steven M. Jensen

(57) ABSTRACT

The image processing apparatus is provided with a preview image generating portion for generating a preview image of image data to be output in the unit of an output job, and an image display portion such as a touch panel for displaying the generated preview image. The image display portion displays a generation stop key for stopping generation of the preview image during the generation of the preview image so as to be selectable by a user, and displays a different screen in accordance with a generation state of the preview image when the generation stop key is selected by a user operation.

13 Claims, 14 Drawing Sheets

IMAGE PROCESSING APPARATUS AND PREVIEW DISPLAY METHOD

CROSS-NOTING PARAGRAPH

This non-provisional application claims priority under U.S.C. §119(a) on Patent Application No. 2008-196797 filed in JAPAN on Jul. 30, 2008, the entire contents of which are hereby incorporated herein by reference.

FIELD OF THE INVENTION

The present invention relates to an image processing apparatus and a preview display method capable of displaying a preview of image data before outputting.

BACKGROUND OF THE INVENTION

Conventionally, some image processing apparatuses such as multi-functional peripherals have a function of displaying a preview of image data targeted for outputting such as printing or sending.

Japanese Laid-Open Patent Publication No. 2006-171861 discloses that a print instruction is executable after confirming all of image data displayed for previewing, that an instruction to generate a preview image of only first several pages is possible when it takes long time to generate a preview image, and that generation of the preview is stopped by a stop instructing button for the preview image during generation of the preview image.

However, in Japanese Laid-Open Patent Publication No. 2006-171861, when the preview display is stopped by a printing stop instructing button, both the preview display and the print instruction are only able to be canceled, and there is no description about subsequent processing such as image editing accompanying a change in print conditions after the cancel. Accordingly, since the preview display and the printing processing are cancelled at the same time in the technology described in Japanese Laid-Open Patent Publication No. 2006-171861, a user needs to perform a setting of print conditions from the beginning or perform original reading.

SUMMARY OF THE INVENTION

An object of the present invention is to provide an image processing apparatus and a preview display method, in which, in performing a preview display of image data to be output, when a cancel of the preview display is instructed by a user operation, a different screen is displayed in accordance with a generation state of a preview image so that subsequent processing is able to be continued depending on a screen displayed at the time.

Another object of the present invention is to provide an image processing apparatus that includes a preview image generating portion for generating a preview image of image data to be output in the unit of an output job; and an image display portion for displaying the preview image generated by the preview image generating portion, wherein the image display portion displays a generation stop key for stopping generation of the preview image during generation of the preview image so as to be selectable by a user, and in the image processing apparatus, when the generation stop key is selected by a user operation, the preview image generating portion stops generation of the preview image, and the image display portion displays a different screen in accordance with a generation state of the preview image when the generation stop key is selected.

Another object of the present invention is to provide the image processing apparatus, wherein in case at least a sheet of the preview image is generated when the generation stop key is selected, the image display portion displays a preview display screen that includes the preview image generated before the generation stop key is selected.

Another object of the present invention is to provide the image processing apparatus, wherein the image display portion displays a reset key for shifting to a resetting screen to change processing conditions of output processing on the preview display screen so as to be selectable, and displays the resetting screen when the reset key is selected by the user.

Another object of the present invention is to provide the image processing apparatus, wherein in case the preview image is not generated at all by the preview image generating portion when the generation stop key is selected, the image display portion displays an initial setting screen that is a first screen to set processing conditions of output processing.

Another object of the present invention is to provide the image processing apparatus, wherein the resetting screen includes a repreview key for starting generation of a new preview image by the preview image generating portion.

Another object of the present invention is to provide the image processing apparatus, wherein when the repreview key is selected by the user and generation of the new preview image is started by the preview image generating portion, the generation stop key is displayed again, and when the generation stop key is selected by the user, the generation stop key is deleted and the resetting screen is displayed again.

Another object of the present invention is to provide the image processing apparatus, wherein in case acquisition of the image data to be output is executed when the generation stop key is selected by the user, the acquisition is stopped.

Another object of the present invention is to provide the image processing apparatus, wherein when the acquisition is stopped, the image display portion displays an initial setting screen that is a first screen to set processing conditions of output processing.

Another object of the present invention is to provide the image processing apparatus, wherein the image display portion displays the number of sheets of the generated preview image while the preview image is generated by the preview image generating portion.

Another object of the present invention is to provide the image processing apparatus, wherein the image display portion displays the number of sheets of the preview image that has been generated by the preview image generating portion when the generation stop key is selected.

Another object of the present invention is to provide the image processing apparatus, wherein when the generation stop key is selected, the image display portion displays that generation of the preview image is stopped, while the preview image generating portion continues generation without stopping generation of the preview image.

Another object of the present invention is to provide the image processing apparatus, wherein the preview image is an image generated by reducing the image data to be output.

Another object of the present invention is to provide the image processing apparatus, wherein the preview image is an image that sequentially displays the image data to be output in the unit of a page to be output.

Another object of the present invention is to provide the image processing apparatus, wherein the preview image is displayed in a final output form.

Another object of the present invention is to provide a preview display method in an image processing apparatus that includes a preview image generating portion and an image display portion, comprising a step in which the preview image generating portion generates a preview image of image data to be output in the unit of an output job; a step in which the image display portion displays the preview image generated by the preview image generating portion; a step in which the image display portion displays a generation stop key for stopping generation of the preview image during the generation of the preview image so as to be selectable by a user; and a step in which, when the generation stop key is selected by a user operation, the preview image generating portion stops generation of the preview image, and the image display portion displays a different screen in accordance with a generation state of the preview image when the generation stop key is selected.

Another object of the present invention is to provide the preview display method, wherein in case at least a sheet of the preview image is generated when the generation stop key is selected, a step in which the image display portion displays a preview display screen that includes the preview image generated before the generation stop key is selected is included.

PREFERRED EMBODIMENTS OF THE INVENTION

Now, a preferred embodiment of the present invention will hereinafter be described with reference to the drawings. An embodiment in which an image sending apparatus according to the present invention is applied to a digital multi-functional peripheral having a print function, a copy function, and a facsimile sending and receiving function, etc., will hereinafter be described specifically with reference to the drawings showing the embodiment.

<Apparatus Configuration>

Figure 1:
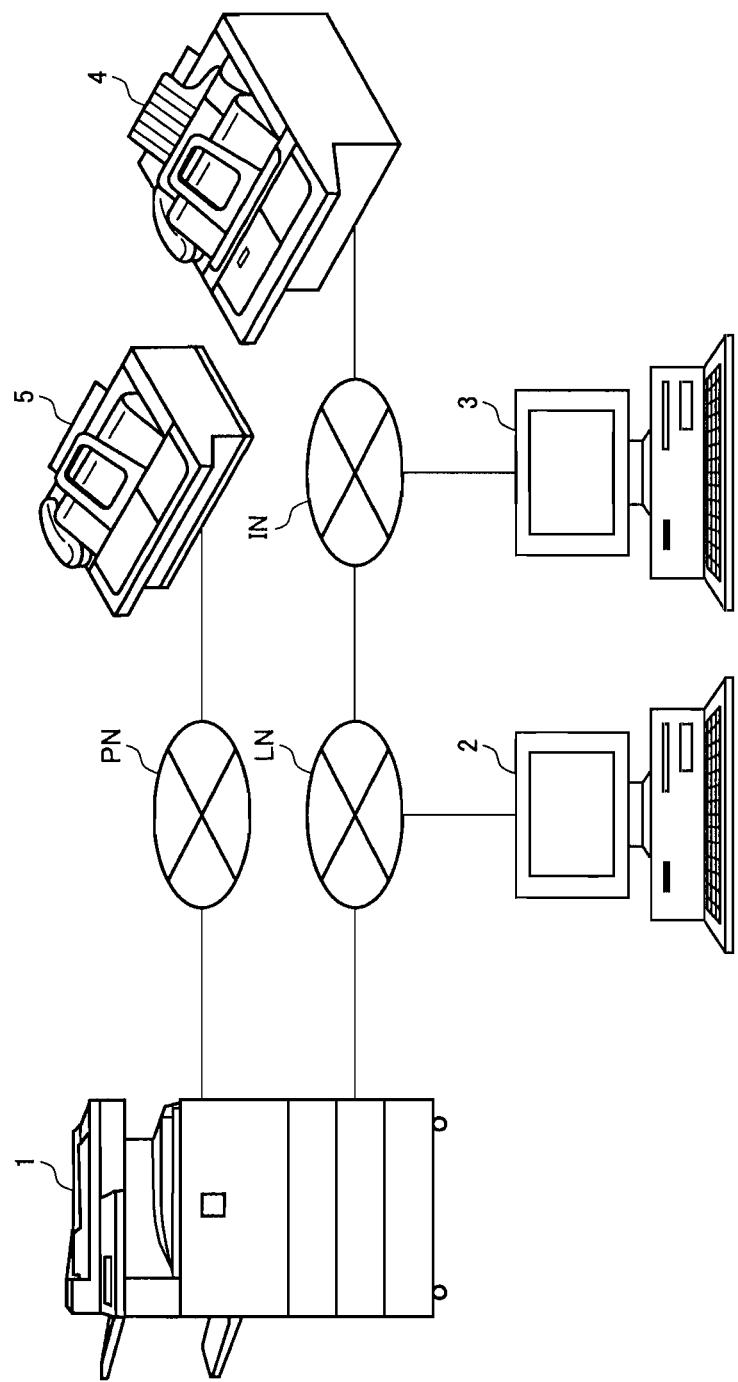
FIG. 1 is a schematic diagram for showing an exemplary configuration of an image processing system constructed by using a digital multi-functional peripheral as an example of an image processing apparatus according to an embodiment of the present invention.

FIG. 1 is a schematic diagram for showing an exemplary configuration of an image processing system constructed by using a digital multi-functional peripheral as an example of an image sending apparatus according to an embodiment of the present invention. In FIG. 1, 1 denotes a digital multi-functional peripheral, 2 and 3 denote external computers, 4 denotes an internet facsimile apparatus (internet FAX apparatus), and 5 denotes a facsimile apparatus.

The digital multi-functional peripheral 1 has a print function and a copy function, as well as a function of sending and receiving image data by facsimile (facsimile function) and/or a function of sending and receiving image data by internet FAX (internet FAX function). This digital multi-functional peripheral 1 is connected to various external devices through a communication network. For example, an external computer 2 such as a personal computer (PC) is connected to a communication network LN that is laid as a local communication network, and an external computer 3 and an internet FAX apparatus 4 are connected to an internet network IN that is connected through a gateway not shown in the figure or the like. Further, an external facsimile apparatus 5 is connected through a public telephone network PN. Note that, as described above, although description will be given only for the case where the image processing apparatus according to the present invention is applied to the digital multi-functional peripheral 1, the image processing apparatus according to the present invention is applicable not only to an image forming apparatus such as a multi-functional peripheral or a printer but also to an image sending apparatus such as the internet FAX apparatus 4 or the facsimile apparatus 5.

Figure 2:
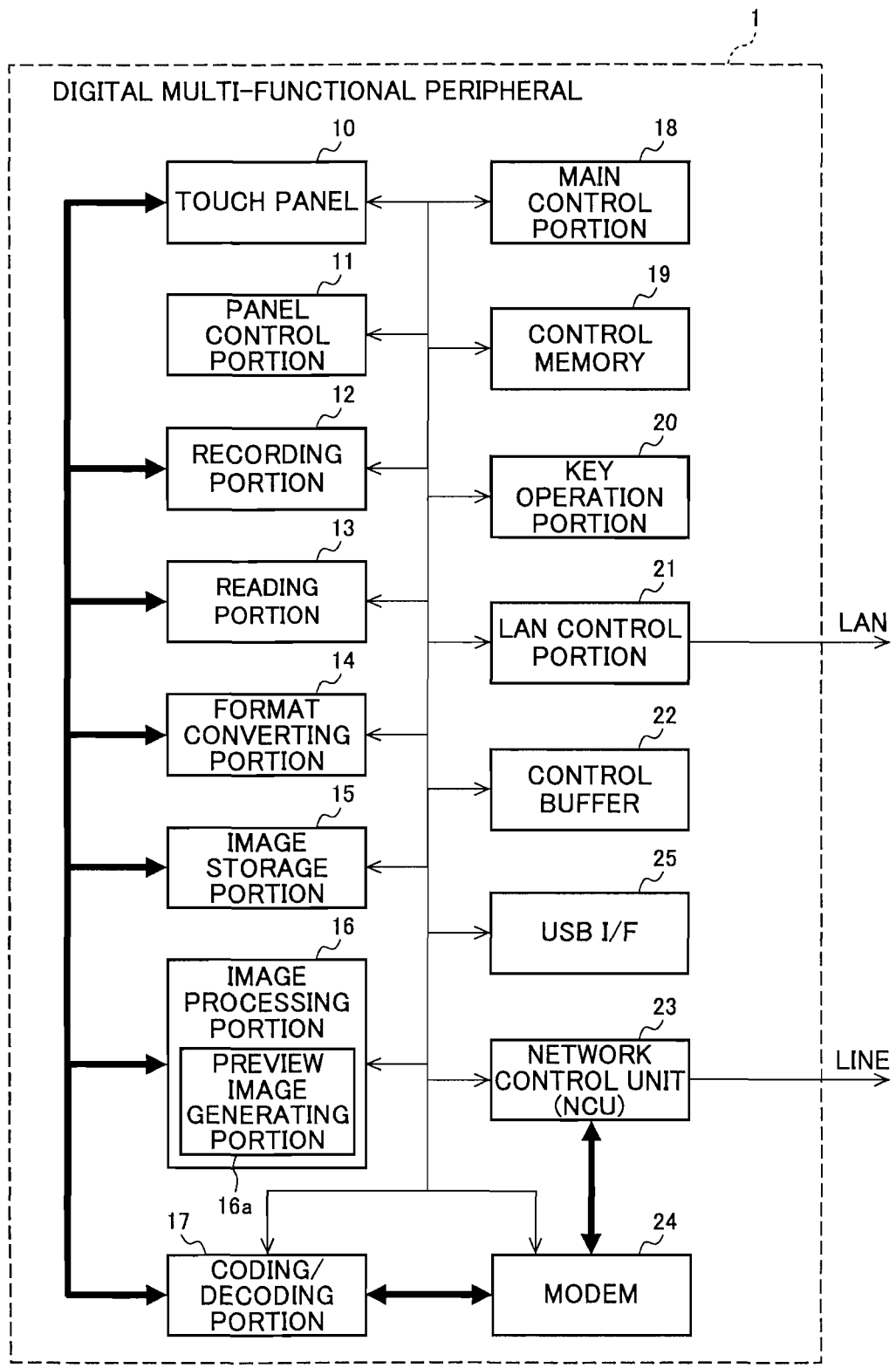
FIG. 2 is a schematic block diagram for showing an exemplary configuration of the digital multi-functional peripheral of FIG. 1.
Figure 3:
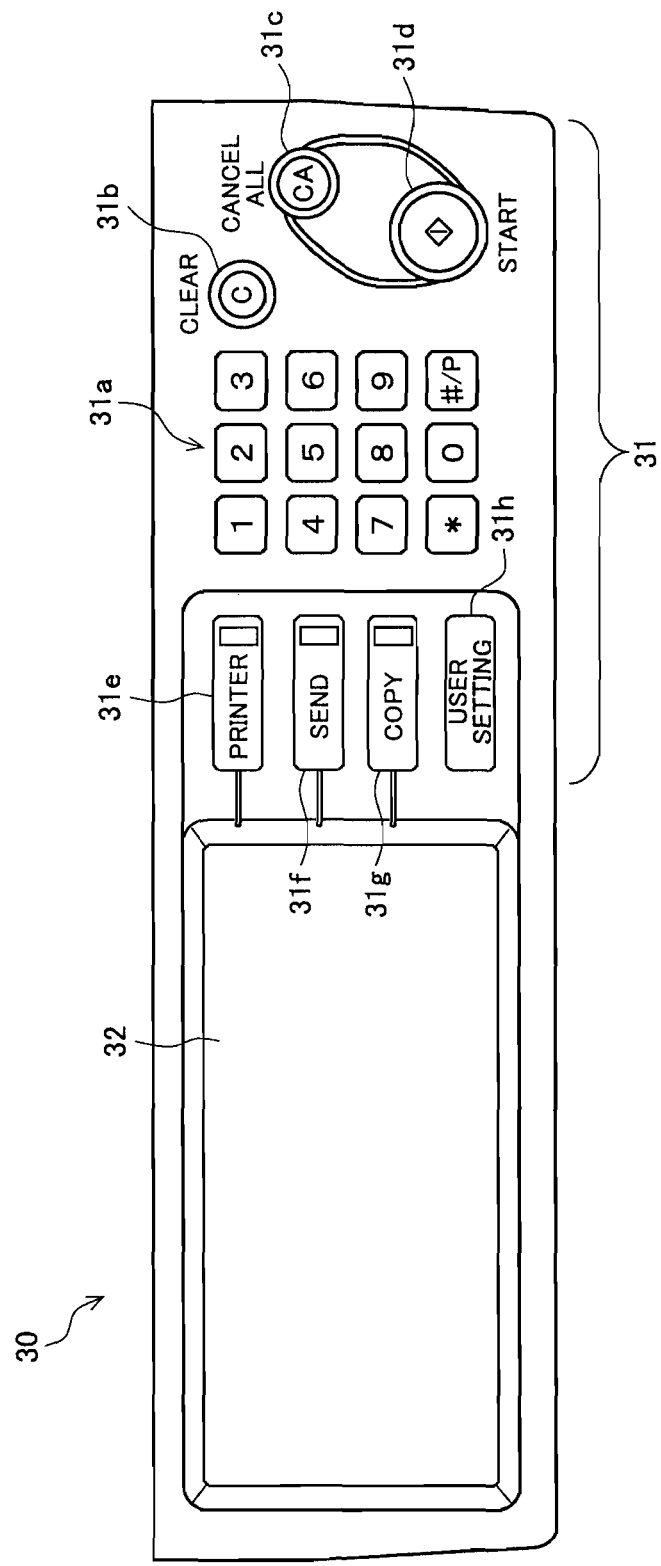
FIG. 3 is an external view for showing an example of a touch panel and a key operation portion in the digital multi-functional peripheral of FIG. 2.

Description will be given for a configuration and an operation of the digital multi-functional peripheral 1. FIG. 2 is a schematic block diagram for showing an exemplary configuration of the digital multi-functional peripheral of FIG. 1, and FIG. 3 is an external view for showing an example of a touch panel and a key operation portion of the digital multi-functional peripheral of FIG. 2.

The digital multi-functional peripheral 1 illustrated in FIG. 2 is provided with a touch panel 10, a panel control portion 11, a recording portion 12, a reading portion 13, a format converting portion 14, an image storage portion 15, an image processing portion 16, a coding/decoding portion 17, a main control portion 18, a control memory 19, a key operation portion 20, a LAN (Local Area Network) control portion 21, a control buffer 22, a network control unit (NCU) 23, a modem 24, and a USB (Universal Serial Bus) interface (I/F) 25. The digital multi-functional peripheral 1 may be also provided with a post processing apparatus that performs the punching and stapling processing, and description will hereinafter be given with reference to an embodiment provided with the post processing apparatus.

The main control portion 18 is comprised of a CPU (Central Processing Unit), a DSP (Digital Signal Processor), or the like. The control memory 19 is comprised of a nonvolatile memory or the like, such as a ROM (Read Only Memory) or an EEPROM (Electrically Erasable and Programmable ROM). A program (firmware) and various setting data are stored in the control memory 19 so as to be readable from the main control portion 18. Among them, at least the various setting data is stored in a rewritable memory. The program and the various setting data may be stored in hard disc as an exemplary configuration of the image storage portion 15, which will be described below. The control buffer 22 is comprised of a volatile memory such as a RAM (Random Access Memory).

The above-described program is used for the main control portion 18 to carry out a command concerning generation and display of a preview image, which will be described below, according to the present invention, as well as a command concerning generation/sending/reception, etc., of a facsimile image and an electronic mail, etc., a command concerning reading of an original, a command concerning printing, a command concerning reading and printing (that is, copying) of an original, and the like, with respect to other parts. This program is developed by the main control portion 18 on the control buffer 22 and is executed by referring to various setting data appropriating the control buffer 22 as a data area for temporal storing (working).

The reading portion 13 reads an original as a bitmap image of RGB (R: Red, G: Green, and B: Blue) with a predetermined resolution by a scanner using a CCD (Charge Coupled Device) and outputs the read RGB image data (dot image data) to the image processing portion 16. The image processing portion 16 is comprised of an ASIC (Application Specific Integrated Circuit) or the like, and applies various image processing to target image data. An example of the image processing will be described below. The ASIC may be incorporated with other parts such as the coding/decoding portion 17.

The image storage portion 15 is comprised of hard disc or the like, and stores image data that has been read by the reading portion 13 and has passed through the image processing portion 16, image data that has been received from outside through the LAN control portion 21, the NCU 23, etc., and the like. When image data is stored in the image storage portion 15, data that has been coded by the coding/decoding portion 17 may be also stored. Moreover, the image storage portion 15 may temporarily save intermediate data generated during image processing at the image processing portion 16.

The coding/decoding portion 17 compresses image data by coding and decodes (expands) the coded image data to original image data. For example, the coding/decoding portion 17 performs coding of image data read from an original, decoding of the coded data, decoding of coded image data received from outside, and the like. In the coding/decoding portion 17, coding systems corresponding to purposes are usable, including JPEG (Joint Photographic Experts Group) that is generally used in filing, and MH (Modified Huffman), MR (Modified READ) and MMR (Modified Modified READ) that are generally used in facsimile communication. As the coding system, MH is employable in IP facsimile communication, and MH, MR, and MMR as well as JPEG and JBIG (Joint Bi-level Image Experts Group) are employable in internet facsimile communication.

The format converting portion 14 converts read image data or image data received from outside into a predetermined file format such as a PDF (Portable Document Format), a GIF (Graphics Interchange Format), or a TIFF (Tag Image File Format).

The recording portion 12 is provided with a printer apparatus that employs a printing system such as an electrophotographic system or an inkjet system, and records (that is, prints) image data and the like stored in the image storage portion 15 on recording paper. The USB I/F 25 is an I/F for connecting to a USB device such as a USB memory, and outputs image data and the like after original reading that is stored in the image storage portion 15 or reads a file from the USB device.

The modem 24 is comprised of a facsimile modem capable of facsimile communication, and is connected to a telephone line and is directly connected to the NCU 23. The NCU 23 is connected to the telephone line to control the line. That is, the NCU 23 is hardware that performs an operation of closing and opening the line with an analogue public switched telephone network (PSTN), and connects the modem 24 to the public switched telephone network as necessary. Such a configuration enables to send image data stored in the image storage portion 15 to outside by facsimile, to receive facsimile image data from the telephone line to store in the image storage portion 15, or to print by the recording portion 12 directly.

The LAN control portion 21 is connected to a LAN and performs communication of electronic mail data and communication of internet FAX via an internet. The internet FAX uses a LAN interface or the like to send and receive an electronic mail through a computer network such as a LAN.

The touch panel 10 or the key operation portion 20 receives an operation for selecting desired processing out of processing of reading an original, processing of sending and printing image data, etc., an operation for starting the processing, an operation for performing a setting that is necessary when each processing is executed (a selecting operation or an inputting operation), and the like. Various examples of the setting include a setting of the number of print sheets in printing, a setting of punch and staple, and a setting of destination information in sending a facsimile image or an electronic mail.

The key operation portion 20 is provided with a key group necessary for operations. The touch panel 10 has a display portion and an operation receiving portion such as a touch sensor. The touch panel 10 is subjected to display control and operation reception control by the panel control portion 11. That is, the panel control portion 11 performs the display control for the display portion and the operation reception control for the operation receiving portion in the touch panel 10.

On the display portion of the touch panel 10, a current operating state, setting information (for example, sending destination, etc.,) and the like are displayed. The display is realized when the panel control portion 11 performs control to display a GUI (Graphical User Interface) image. The GUI enables to change the display and an operation received position depending on a user operation. Each GUI and images thereof may be stored so as to be readable in an internal memory of the panel control portion 11 or the control memory 19. In addition, as the display portion, display devices in various display systems including liquid crystal displays and organic EL (Electroluminescence) displays are employable.

The user operation received on the touch panel 10 is interpreted by the panel control portion 11 and is transmitted as an operation signal to the main control portion 18. The user operation received by the key operation portion 20 is interpreted by the key operation portion 20 itself and transmitted as an operation signal to the main control portion 18. The main control portion 18 issues a command in accordance with the operation signal obtained in this manner to other parts to cause the other parts to execute processing in accordance with the user operation. Note that, although description has been given with reference to the touch panel 10 in which the display device and the operation portion are integrated, only the display apparatus may be simply provided instead of the touch panel 10 and, in that case, where the user operation is received only by the key operation portion 20.

The touch panel 10 and the key operation portion 20 may be configured as an operation panel 30 as illustrated in FIG. 3, and the operation panel 30 is comprised of a key operation portion 31 (corresponding to the key operation portion 20) provided with various hardware keys and a touch panel 32 (corresponding to the touch panel 10) comprised of a liquid crystal display and a touch sensor. The present invention will hereinafter be described in detail with the touch panel 32 and the key operation portion 31 applied in the configuration of FIG. 1 instead of the touch panel 10 and the key operation portion 20.

The key operation portion 31 is provided with, as hardware keys, a numeric keypad 31*a* for inputting numeric values, a clear key 31*b* for clearing input set values, a cancel all key 31*c* for canceling all of various input settings, and a start key 31*d* for receiving instructions of start of copying, start of sending, etc., as well as function switch keys 31*e*, 31*f*, and 31*g* for switching a print function, a sending function and a copy function, and a system setting key 31*h* for receiving a setting by a user.

An exemplary operation in the digital multi-functional peripheral 1 having the above-described exemplary configuration will be described.

<Original Reading Operation>

An original reading operation is performed when image data of a read original is stored (filed) in the image storage portion 15, when image data of a read original is sent to outside, when image data of a read original is printed (that is, copied), and the like.

When a user operation to perform processing requiring original reading is received by the operation panel 30, the main control portion 18 gives an instruction to the reading portion 13, the image storage portion 15, the image processing portion 16, the coding/decoding portion 17, and the like to execute processing as will be described below.

The reading portion 13 optically reads an image of an original placed on a document platen or an automatic document feeder and provides the image processing portion 16 with RGB image data (bitmap data of RGB) as a result of reading. The image processing portion 16 executes various image processing (hereinafter, referred to as original image processing) such as A/D conversion, shading correction, and γ correction for the RGB image data. Here, the shading processing is processing to remove various distortions generated in an illumination system, an image focusing system, and an image sensing system of the reading portion 13.

As the original image processing, original determination processing and segmentation processing may be executed subsequently to the A/D conversion, the shading correction, and the γ correction. The original determination processing includes processing of determining a type of the original and processing of determining whether the original is a color original or a monochromatic original based on input image data (image data subjected to the γ correction in this case). Examples of the type of the original include a text original, a printed photograph original, and text and printed photograph original in combination thereof. The image processing portion 16 outputs a determination signal (hereinafter, referred to as original determination data) as a result of the original type determination processing and the monochromatic/color original determination processing. The segmentation processing is processing of determining to what kind of area each pixel of the input image data (image data subjected to the γ correction in this case) belongs, and an example thereof includes processing of determining to which area including a black text area, a color text area and a halftone area each pixel belongs. The image processing portion 16 outputs segmentation data as a result of the determination. Note that, the segmentation processing may be executed based on the result of the above-described original determination processing and monochromatic/color original determination processing.

The original determination data and the segmentation data are stored in the image storage portion 15 in association with corresponding image data (image data subjected to the original image processing). At this time, the original determination data and the segmentation data are coded by the coding/decoding portion 17 and each coded data is thereafter stored in the image storage portion 15 in association with the corresponding image data. Note that, although the coding in storing in the image storage portion 15 is not essential, description will be given assuming that the image data is stored in a state of being coded. This is also the same in operations other than the original reading operation.

<Printing Operation>

By the above-described original reading operation, processing up to filing of the image data of the read original is completed. Next, description will be given for a printing operation when the image data of the read original is printed (that is, when the original is copied). When the user operation to perform processing requiring printing is received by the operation panel 30, the main control portion 18 gives an instruction to the recording portion 12, the image storage portion 15, the image processing portion 16, the coding/decoding portion 17, and the like to execute processing as will be described below. Note that, the main control portion 18 also gives an instruction to the reading portion 13 (original reading instruction), for example, when a copy operation is performed.

The digital multi-functional peripheral 1 is also capable of adding additional information such as a fixed stamp, date (or date and time), and a page number to image data in printing, and when such an adding instruction is given, the main control portion 18 controls the image processing portion 16. The additional information added to the image data is an additional image. The additional information is stored in the control memory 19 and is read out as necessary. Of course, the additional information may be originally stored as data of the additional image. In addition, a plurality of additional information may be stored in the control memory 19 and additional setting information may be stored in the control memory 19. The additional setting information includes at least information showing a position to add to the image data (hereinafter, referred to as an adding position), and when a plurality of additional information is stored, information that any of which is to be selected is also included. Moreover, when an instruction to execute the punching or stapling processing by the post processing apparatus is given, the main control portion 18 also controls the post processing apparatus.

The coding/decoding portion 17 reads and decodes image data to be printed and original determination data and segmentation data corresponding thereto from the image storage portion 15, which are provided to the image processing portion 16. The image processing portion 16 executes various image processing (hereinafter, referred to as image processing for printing) for the decoded image data (RGB image data). As will be schematically described below, examples of the image processing for printing include image quality adjustment processing, two-color processing, color correction processing, black generation and under color removal processing, spatial filter processing, scaling processing, output tone correction processing, and halftone generation processing. The black generation and under color removal processing, the spatial filter processing, and the halftone generation processing are processing in accordance with various areas indicated by the segmentation data.

As the image quality adjustment processing, a background is detected from the decoded image data to perform background removal. Moreover, as the image quality adjustment processing, RGB adjustment (color adjustment; entire color adjustment of redness or blueness), brightness adjustment, and vividness adjustment are also performed for the image data subjected to the background removal based on setting information set by a user from the operation panel 30. At this time, adjustment in accordance with an original type indicated by the original determination data may be performed.

As the color correction processing, CMY data having components of CMY (C: Cyan, M: Magenta, Y: Yellow) which are complementary colors of RGB is generated from the RGB data subjected to the image quality adjustment processing and processing of enhancing color reproduction is performed. As the black generation and under color removal processing, black generation processing of generating black (K) data from the CMY data subjected to the color correction and under color removal processing of subtracting the K data obtained by the black generation from the original CMY data to generate new CMY data. As the spatial filter processing, enhancement processing or smoothing processing is performed for CMYK data which is data of the four colors. When a two-color mode for outputting the image data in two colors (for example, red and black) is selected, the two-color processing is performed. As the two-color processing, processing of converting the RGB data into CMY data that represents specified two colors (red and black in this case) is performed. In the case of the two-color mode, the black generation and under color removal processing is executed for the CMY data subjected to the two-color processing and the spatial filter processing is also executed, however, the color correction processing is not performed.

As the scaling processing, image enlarging processing or image reducing processing is performed for the CMYK data subjected to the spatial filter processing based on a printing copy ratio set by the user operation from the operation panel 30. The printing copy ratio is a copy ratio of a printed image for the image indicated by read and stored image data. Of course, the printing copy ratio is not limited to a copy ratio obtained by the user operation and is a copy ratio set as default when no operation is performed for the printing copy ratio. As the output tone correction processing, output γ correction processing of outputting to a recording medium such as recording paper is performed for the CMYK data. As the halftone generation processing, tone reproduction processing of outputting an image by error diffusion processing and dither processing is performed for the CMYK data subjected to the output tone correction processing. In the output tone correction processing and the halftone generation processing, processing in accordance with an original type indicated by the original determination data may be performed, for example, including differentiating processing contents between a text area and other areas.

The CMYK data subjected to the halftone generation processing is provided to the recording portion 12. Description will be given for the case where additional information is added. There are a method for applying the scaling processing also to the additional information in accordance with a magnification of print data and a method for not applying the scaling processing to the additional information regardless of a magnification of print data. First, when the scaling processing is also performed for the additional information, the main control portion 18 reads the additional information and information showing an adding position, the main control portion 18 or the image processing portion 16 converts into image data as necessary, and the image data of the additional information is provided to the image processing portion 16 before the scaling processing. Note that, the conversion is not necessary when additional image data is originally stored. Subsequently, the image processing portion 16 may synthesize the image data of the additional information and image data to be added which is image data before the scaling processing at the above-described adding position.

When the scaling processing is not performed for the additional information, the main control portion 18 reads the additional information and information showing an adding position, and the main control portion 18 or the image processing portion 16 converts into image data as necessary. In this example, CMYK data is obtained by the conversion. Note that, the conversion is not necessary when additional image data is originally stored. Subsequently, the image processing portion 16 may synthesize the image data of the additional information with image data to be added which is image data subjected to the scaling processing (the above-described CMYK data targeted for the output tone correction processing or the halftone generation processing) at the above-described adding position.

In either case, it is possible to output CMYK data subjected to the halftone generation processing with the additional information added thereto by the image processing portion 16. Note that, in the digital multi-functional peripheral 1, additional information and an adding position thereof are able to be set by the user with the operation panel 30 while performing a preview display described below.

The recoding portion 12 receives the image data to which the image processing for printing has been given by the image processing portion 16 in this manner (CMYK image data in this example) and generates a hard copy (prints out) by an electrophotographic system, an inkjet system, or the like. Then, the post processing apparatus executes the punching or stapling processing for printed sheets as necessary. Note that, the data targeted for the printing operation described here is not limited to the image data read by the reading portion 13, and, for example, image data (image file) that has been previously transferred from an external recoding medium such as a USB memory, a PC connected through a network, or the like and stored in the image storage portion 15 is also applicable in the same manner. The printing operation for the image data that has been received by facsimile and stored in the image storage portion 15 will be described below.

<Preview Display Operation for Image Data to be Printed>

Next, description will be given for an operation of displaying a preview of image data stored in the image storage portion 15 as a result of original reading on the touch panel before printing (preview display operation). The digital multi-functional peripheral 1 is configured so as to allow image data to be printed to be displayed for previewing (thumbnail display). The preview display operation is performed when the user operation to perform processing requiring the preview display is received by the operation panel 30. For example, the preview display operation is also performed when a setting is made such that a preview of the image data after the original reading is firstly displayed before executing printing. For example, at a stage where a setting for performing the preview display is performed and copy conditions are then set to depress the start key, the original reading may be started and a preview image may be displayed on the touch panel 32 after the reading.

The main control portion 18 gives an instruction to the image storage portion 15, the image processing portion 16, the coding/decoding portion 17, the panel control portion 11, and the like to execute processing as will be described below. Note that, the main control portion 18 also gives an instruction to the reading portion 13 (original reading instruction), for example, when an operation of copying an original is performed.

The coding/decoding portion 17 reads and decodes image data to be displayed for previewing and original determination data and segmentation data corresponding thereto from the image storage portion 15, which is provided to the image processing portion 16. The image processing portion 16 executes various image processing (hereinafter, referred to as image processing for previewing) for the decoded image data (RGB image data). As will be schematically described below, examples of the image processing for previewing include image quality adjustment processing, two-color processing, color correction processing, spatial filter processing, scaling processing, and output tone correction processing. The spatial filter processing and the output tone correction processing are processing in accordance with various areas indicated by the segmentation data.

The image quality adjustment processing here is the same as the image quality adjustment processing in the image processing for printing. As the color correction processing, processing of converting the image data subjected to the image quality adjustment processing (RGB data) into R'G'B' data based on display characteristics of the touch panel 32. As the spatial filter processing, enhancement processing or smoothing processing is performed for the R'G'B' data.

As the scaling processing, image enlarging processing/image reducing processing in accordance with a print magnification is performed for R'G'B' data subjected to the spatial filter processing, and further processing for converting a pixel number of the R'G'B' data into a pixel number (display resolution) of the touch panel 32 is performed and the image enlarging processing or image reducing processing is performed based on a preview display magnification at the same time. Note that, the preview display magnification is a magnification, for example, such as twice or four times, and is a magnification of an image in the preview display.

A preview image generating portion 16a provided in the image processing portion 16 generates an image for the preview display (preview image) mainly by such scaling processing for the preview display.

Description will be given for a preview image when additional information is added. As described above, the digital multi-functional peripheral 1 is capable of outputting image data to be output with additional information added thereto, and the preview display is executed when the panel control portion 11 performs control to display an image showing the additional information. Thus, the preview image generating portion 16a generates such an image showing the additional information, which is synthesized with the preview image generated from the image data to be output, to thereby generate a preview image with the additional information. The panel control portion 11 causes the touch panel 32 to display the preview image.

The additional information is able to be output with image data to be printed by performing the scaling processing in accordance with a print magnification, or is also able to be output in a state of being added to image data to be printed, to which the scaling processing in accordance with a print magnification has been given. First, when the scaling processing is also performed for the additional information to output, the main control portion 18 reads the additional information and an adding position thereof and provides to the image processing portion 16 before the scaling processing. Subsequently, the preview image generating portion 16a generates R'G'B' data of an image showing the additional information to synthesize with image data to be added which is image data before the scaling processing at the above-described adding position. Then, the image enlarging processing/image reducing processing in accordance with a print magnification may be applied to the R'G'B' data to which the image of the additional information has been added.

When the scaling processing is not performed for the additional information, the main control portion 18 reads the additional information and an adding position thereof and provides to the image processing portion 16. Subsequently, the preview image generating portion 16a generates R'G'B' data of an image showing the additional information from the additional information to synthesize with R'G'B' data subjected to the image enlarging processing/image reducing processing in accordance with a print magnification at the above-described adding position, and performs processing for converting a pixel number of the R'G'B' data after the addition into a pixel number (display resolution) of the touch panel 32 and the image enlarging processing or image reducing processing based on a preview display magnification at the same time.

Moreover, when the punching or stapling processing is applied by the post processing apparatus, image data for post processing such as punch or staple may be output by being synthesized with a preview image generated from image data to be printed (and data of the image showing the additional information) at a punching position or a stapling position. Alternatively, separately from a preview image generated from image data to be printed (and data of the image showing the additional information), image data for post processing such as punch or staple may be output to be aligned in adjacent thereto. In the latter case, since the synthesizing processing is not required, the processing speed gets fast. Either method is capable of displaying an output state of paper on which an image is to be formed in the preview display of image data.

As the output tone correction processing, output γ correction processing for displaying image data on the touch panel 32 is performed for the R'G'B' data of the preview image or the R'G'B' data of the preview image and the image for post processing. In the output tone correction processing, processing in accordance with an original type indicated by the original determination data may be performed, for example, including differentiating processing contents between a text area and other areas.

The two-color processing is executed only when a two-color mode for outputting image data in two colors of red and black, for example, is selected. As the two-color processing, processing of converting the RGB data subjected to the image quality adjustment processing into CMY data that represents specified two colors (red and black in this case) is performed. The generated CMYK data is converted into R'G'B' data based on display characteristics of the touch panel 32 at the subsequent color correction processing.

The R'G'B' data generated by the preview image generating portion 16a and subjected to the output tone correction processing is provided to the touch panel 32. The panel control portion 11 performs control for the touch panel 32 to display an image corresponding to the R'G'B' data in a state of being incorporated in a GUI image and displays the GUI image on the touch panel 32. A user is able to confirm an image displayed for previewing that includes the image showing the additional information and determine whether to directly execute or stop printing or whether to delete the additional information or execute changing of the adding position (or changing of the additional information) to perform an operation corresponding thereto.

<Supplement for Original Reading, Preview Display and Printing>

Although description has been given for the preview display operation separately from the printing operation, the printing operation may be performed such that the image data (CMYK data) subjected to the output tone correction processing is converted into the R'G'B' data based on display characteristics of the touch panel 32, is processed by conversion processing corresponding to a pixel number (display resolution) of the touch panel 32 and scaling processing in the preview display, and is displayed on the touch panel 32 in a state of being incorporated in a GUI image. Since the printing operation is completed to a certain extent and the printing operation after the preview display is able to be completed quickly, it is useful in a case where a setting is made such that a preview is previously displayed, for example, when the copy operation is performed.

In addition, an example in which the coded image data, the original type data and the segmentation data are stored in the image storage portion 15 in association with one another has been taken as the original reading operation, based on which the printing operation and the preview display operation have been also described. As an alternative method thereof, coding may be performed only for the image data read by the reading portion 13, which is temporarily stored in the image storage portion 15. In this case, it may be configured such that the image processing portion 16 applies the original type determination processing and the segmentation processing for the image data that has been read from the image storage portion 15 and decoded by the coding/decoding portion 17 in the printing operation and the preview display operation. In addition, such an alternative method is also applicable in sending image data such as sending by facsimile or sending by internet FAX, which will be described below.

<Supplement for Filing Operation>

As described as the original reading operation, the filing operation is an operation of storing read image data (which is coded as necessary) in the image storage portion 15 provided inside the digital multi-functional peripheral 1. In filing, it is also possible to store (file) image data to be stored after adding additional information thereto. The preview display operation for the image data to be filed in the image storage portion 15 is basically as described in the image data to be printed.

<Printing Operation for Image Data Received by Facsimile>

Next, description will be given for the printing operation for image data received by facsimile communication. When detecting a facsimile communication request by the modem 24, the main control portion 18 gives an instruction to the recording portion 12, the image storage portion 15, the image processing portion 16, the NCU 23, the modem 24, and the like to execute processing as will be described below.

First, the modem 24 and the NCU 23 sequentially receive image data (compressed image data) sent from a sending source while performing communication procedure and expands the received compressed image data, and executes rotating processing (processing of rotating a sending direction), resolution conversion processing, and the like as necessary to provide to the image processing portion 16 at the same time.

Since the image data received by facsimile communication is black-and-white binary data, in the image processing portion particular processing is not performed for the image data (K data) to which processing such as expansion has been given, which is directly provided to the recording portion 12. The recording portion 12 receives the image data and executes printing by an electrophotographic system, an inkjet system, or the like. It is also possible to perform printing for the image data received by facsimile communication after adding the above-described additional information thereto.

Description has been given for the facsimile reception of the monochromatic image, but when a color facsimile image (RGB data) is received, the image processing portion 16 may execute the image processing for facsimile reception described here for the RGB data.

<Preview Display Operation for Image Data Received by Facsimile>

The preview display operation for image data received by facsimile communication will be briefly described based on the printing operation for the same image data. The preview display operation is performed, for example, when a previous setting or a user operation to execute printing after confirming the received image data in advance is performed. In the preview display operation, when the additional information is added to the image data to which processing such as expansion has been given, the image processing portion 16 synthesizes the image data of the additional information, and then performs the conversion processing in accordance with a pixel number (display resolution) of the touch panel 32 and scaling processing in the preview display, followed by displaying the image data subjected to the scaling processing on the touch panel 32 in a state of being incorporated in a GUI image. The preview display before executing printing for the image data received by facsimile may be treated as a copy mode. A user is able to confirm the image displayed for previewing and determine whether to execute or cancel printing to perform a printing or cancelling operation.

<Facsimile Sending Operation>

Next, description will be given for a sending operation when image data of a read original is sent by facsimile. The facsimile image data is sent to destination (sending destination) information set by the user operation from the touch panel 32 or the key operation portion 31. The destination information (telephone number in this example) is stored in the control memory 19 and is read as necessary. The destination information is generally stored as address book data so that information of a plurality of destinations is viewable and selectable, or is directly input before sending.

When the user operation to execute the facsimile sending is received by the operation panel 30, the main control portion 18 gives an instruction to the image storage portion 15, the image processing portion 16, the coding/decoding portion 17, the NCU 23, the modem 24, and the like to execute processing as will be described below. Note that, the main control portion 18 also gives an instruction to the reading portion 13 (original reading instruction), for example, when the operation to send the original by facsimile is performed. Note that, it is also possible to select image data to be sent and start sending the image data by facsimile while displaying a preview of the image data stored in the image storage portion 15.

The coding/decoding portion 17 reads and decodes image data to be printed, and original determination data and segmentation data corresponding thereto from the image storage portion 15, which is provided to the image processing portion

16. The image processing portion 16 executes various image processing (hereinafter, referred to as image processing for facsimile sending) for the decoded image data (RGB image data). As will be schematically described below, examples of the image processing for facsimile sending include image quality adjustment processing, spatial filter processing, scaling processing, output tone correction processing, and halftone generation processing. The spatial filter processing and the halftone generation processing may be processing in accordance with various areas indicated by the segmentation data, where the segmentation data may not be used. Further, in the original reading operation following the facsimile sending, the segmentation processing for the read image data and coding and storage of the segmentation data may not be executed.

As the image quality adjustment processing, the decoded image data is converted into K data using a matrix coefficient. In this case, a matrix coefficient in accordance with an original type indicated by the original determination data may be used. As the spatial filter processing, enhancement processing or smoothing processing is performed for the K data. As the scaling processing, image enlarging processing and image reducing processing in accordance with a sending resolution set by the operation panel 30 or a sending resolution set as default are performed for the K data subjected to the spatial filter processing. As the output tone correction processing, output γ correction processing intended to output to a recording medium such as recording paper at a sending destination, for example, is performed for the K data subjected to the scaling processing. Actually, not output γ correction processing for a device of the sending destination but output γ correction processing for a general device may be performed. As the halftone generation processing, binarization by error diffusion processing, for example, is performed for the K data subjected to the output tone correction processing. In the output tone correction processing and the halftone generation processing, processing in accordance with an original type indicated by the original determination data may be performed.

Description has been given for the facsimile sending of the monochromatic image, but when a color image is sent by facsimile, the image processing portion 16 may perform processing of converting the decoded image data into L*a*b* data for color transmission using a matrix coefficient as the image quality adjustment processing in the above-described image processing for facsimile sending so that the subsequent processing is performed for the L*a*b* data.

The image data subjected to the halftone generation processing is processed by rotating processing as necessary and is compressed and coded by the coding/decoding portion 17 with a compression format for the facsimile sending to be temporarily stored in the image storage portion 15. The modem 24 performs sending procedure to a sending destination set through the NCU 23, and at the time when communication with the sending destination is established (at the time ready for sending), the temporarily stored and coded K data is read and sequentially sent to the sending destination through the public network after necessary processing such as changing of the compression format.

In addition, the digital multi-functional peripheral 1 is also capable of sending image data to be sent with additional information added thereto. When sending image data to the outside like in this example, it is also possible to add sending source information (transmission source information) in addition to a stamp, date (date and time), and a page number as the additional information. In this case, the sending source information that is added in sending image data may include any one of or a plurality of information of a name of a sender, information of a telephone number of a sending source, and information of an electronic mail address of a sending source. Moreover, information of a sending destination (information of a destination) and the like may be added as the additional information in sending image data.

In the case of the facsimile sending with additional information added, synthesizing processing may be performed as follows. The main control portion 18 reads additional information and information showing an adding position, the main control portion 18 or the image processing portion 16 converts into image data, and the image processing portion 16 synthesizes the converted image data (image data of additional information) at the above-described adding position in image data to be added which is image data subjected to the scaling processing. In the digital multi-functional peripheral 1, the position at which the image data of the additional information is added is defined as being settable by a user from the operation panel 30 while performing the preview display as will be described below. The synthesized image data is applied with the above-described output tone correction processing, rotating processing, and compression processing, etc., and thereafter sent to the sending destination.

<Preview Display Operation for Image Data to be Sent by Facsimile>

The digital multi-functional peripheral 1 is configured so as to be able to display image data to be sent by facsimile sending or the like for previewing. The preview display operation is performed, for example, when the previous setting or the user operation to execute sending after confirming the image data before sending in advance is performed. Description will be given for the preview display operation for the image data to be sent by facsimile based on the facsimile sending operation for the same image data. In the preview display operation, the main control portion 18 also gives an instruction to the panel control portion 11.

In the preview display operation, the image processing portion 16 may perform the same processing as in the facsimile sending up to the image quality adjustment processing and the spatial filter processing (and the scaling processing), and the preview image generation processing may be executed by the preview image generating portion 16a and the output γ correction processing for displaying the image data may be performed as the output tone correction processing. As the preview image generation processing, the preview image generating portion 16a performs conversion processing in accordance with a pixel number (display resolution) of the touch panel 32 and scaling processing in accordance with a reducing/enlarging ratio in the preview display for image data subjected to the image enlarging processing/image reducing processing in accordance with a sending resolution to thereby generate data of the preview image. Note that, in the preview display operation, the spatial filter processing may not be executed and the halftone generation processing is not executed. Here, a data send mode is a mode for sending image data to the outside (external device), including a facsimile send mode, an internet FAX send mode, and a file transfer mode, and is also referred to as an image send mode.

R'G'B' data generated by the preview image generating portion 16a and subjected to the output tone correction processing is provided to the touch panel 32. The panel control portion 11 performs control for the touch panel 32 to display an image corresponding to the R'G'B' data in a state of being incorporated in a GUI image to display the GUI image on the touch panel 32.

Description will be given for a preview image that is sent with additional information added thereto. The additional information is output by adding to image data subjected to the scaling processing in accordance with a sending resolution. More specifically, the main control portion 18 reads the additional information and an adding position thereof and provides to the image processing portion 16. Subsequently, the preview image generating portion 16a generates R'G'B' data of an image showing the additional information from the additional information and synthesizes with R'G'B' data subjected to the image enlarging processing/image reducing processing in accordance with a sending resolution at the above-described adding position. Then, processing for converting a pixel number of the R'G'B' data after the addition into a pixel number (display resolution) of the touch panel 32 is performed and the image enlarging processing or image reducing processing is performed based on a preview display magnification at the same time.

The image data synthesized with the image of the additional information in this manner is applied with the above-described output tone correction processing (output γ correction processing for displaying image data) in the preview display and is then displayed on the touch panel 32 in a state of being incorporated in a GUI image by the panel control portion 11. A user is able to confirm an image displayed for previewing that includes the image showing the additional information and determine whether to directly execute or stop facsimile sending or whether to delete the additional information or execute changing of the adding position (or changing of the additional information) to perform an operation corresponding thereto.

<Sending Operation for Image Data via Internet>

Next, description will be given for a sending operation when image data of a read original is sent by an electronic mail or internet FAX via the internet. Such image data to be sent via the internet is also sent to sending destination information (electronic mail address in this example) set by the user operation from the touch panel 32 or the key operation portion 31 and stored in the control memory 19.

When the user operation concerning the sending via the internet is received by the operation panel 30, the main control portion 18 gives an instruction to the format converting portion 14, the image storage portion 15, the image processing portion 16, the coding/decoding portion 17, the LAN control portion 21, and the like to execute sending processing via the internet as will be described below. Note that, the main control portion 18 also gives an instruction to the reading portion 13 (original reading instruction), for example, when an operation to send an original via the internet is performed.

The coding/decoding portion 17 reads and decodes image data to be printed and original determination data and segmentation data corresponding thereto from the image storage portion 15, which is provided to the image processing portion 16. The image processing portion 16 executes various image processing (hereinafter, referred to as image processing for internet sending) for the decoded image data (RGB image data) Examples of the image processing for internet sending include the image quality adjustment processing, the spatial filter processing, the scaling processing, the output tone correction processing, and the halftone generation processing, which have been described in the image processing for facsimile sending.

Moreover, the image processing in the case of color image sending is also the same as the image processing for facsimile sending, and in the image processing for internet sending, the image processing portion 16 may perform processing of converting the decoded image data into L*a*b* data for color transmission using a matrix coefficient as the image quality adjustment processing so that the subsequent processing is performed for the L*a*b* data.

The coding/decoding portion 17 codes (compresses) the image data subjected to the image processing for internet sending to obtain compressed files. The compression is performed in the unit of a single page of the original. Subsequently, the format converting portion 14 converts the compressed files into a single file and the file is attached to a multipart mail according to MIME (Multipurpose Internet Mail Extension), for example. By the processing so far, the read image data is converted into a format of an electronic mail. The electronic mail is sent to a sending destination via the internet using a mail transfer protocol such as an SMTP (Simple Mail Transfer Protocol) through a LAN interface by the LAN control portion 21.

In the case of the internet facsimile sending, the coding/decoding portion 17 may perform the compression in a compression format only for facsimile such as MH, for example, and the format converting portion 14 may convert the obtained compressed files in the unit of a page, for example, into a single TIFF file. In the case of sending just by attaching to the electronic mail as an attached file (in the case of sending by so-called scan to e-mail), the coding/decoding portion 17 may perform the compression in a compression format such as JPEG, for example, and the format converting portion 14 may convert the obtained compressed files in the unit of a page into a single PDF file, for example.

In addition, even when image data to be sent is image data sent via the internet, the digital multi-functional peripheral 1 is capable of sending the image data with additional information added thereto in the same manner as the case of the facsimile sending image data. As the additional information adding processing, the synthesizing processing described in the facsimile sending may be executed, and the image data is subjected to the output tone correction processing, the compression processing, the format conversion processing, and the like described above and thereafter sent to an address of a sending destination as an electronic mail.

<Preview Display Operation for Image Data to be Sent via Internet>

As well as mentioned in the description for the preview display in the facsimile sending, the digital multi-functional peripheral 1 is capable of being configured so that a preview of image data to be sent via the internet is also able to be displayed on the touch panel 32.

In the preview display operation, as well as mentioned in the description for the preview display in the facsimile sending, the image processing portion 16 may perform the same processing as in the image processing for internet sending up to the image quality adjustment processing and the spatial filter processing (and the scaling processing), and the preview image generation processing may be executed by the preview image generating portion 16a, and the output γ correction processing for displaying the image data may be performed as the output tone correction processing. R'G'B' data generated by the preview image generating portion 16a and subjected to the output tone correction processing is provided to the touch panel 32 and is displayed on the touch panel 32 in a state of being incorporated in a GUI image by the panel control portion 11. The description for the preview display in the facsimile sending may be also quoted for the preview display with an image showing additional information added.

<Description for Preview Display before Outputting (Sending, Printing, or Filing) Image Data According to the Present Invention>

As described for the preview display operation before printing in copying, filing, and sending data by facsimile or the like, the digital multi-functional peripheral 1 according to the present invention has the preview image generating portion 16a that reads image data to be output from the image storage portion 15 and generates a preview image thereof in the unit of a job. The preview image firstly generated to be displayed at first is an enlarged/reduced image based on a preview display magnification, preferably is a reduced image. The first preview image generated by the preview image generating portion 16a is sent to the touch panel 32 by the control from the main control portion 18, controlled to be displayed in a state of being incorporated in a GUI image by the panel control portion 11, and displayed on the touch panel 32. In this manner, the touch panel 32 is an example of an image display portion that displays a preview of the image data to be output.

The image data to be output may be image data input from any of a scanner apparatus illustrated as the reading portion 13, an attachable/detachable storage apparatus illustrated as the USB memory connected to the USB I/F 25, and a communication line illustrated as the LAN or the line. Alternatively, the image data to be output may also be image data read from a storage apparatus illustrated as the image storage portion 15 provided in the digital multi-functional peripheral 1.

Further, as described above, the digital multi-functional peripheral 1 is capable of outputting image data to be output with additional information added thereto, and the panel control portion 11 performs control to display an image of the additional information on the touch panel 32 based on the control from the main control portion 18. Thus, the preview image generating portion 16a generates such an image of the additional information, which is synthesized with the preview image generated from the image data to be output, to thereby generate a preview image with the additional information. Then, the panel control portion 11 performs control for the touch panel 32 to display the generated preview image with the additional information in a state of being incorporated in a GUI image and displays the GUI image on the touch panel 32.

In this manner, the preview image generating portion 16a and the panel control portion 11 are one example of a display control portion that performs control to display the preview image or control to display the additional information in the preview display for the image display portion. However, the digital multi-functional peripheral 1 according to the present invention needs only to be able to display a preview image and does not necessarily need to display a preview of an image of additional information and to perform the above-described preview display of an image showing post processing. Although description has been given assuming that an image showing additional information itself is synthesized at an adding position to be displayed in the preview display, it may be configured such that an existence image showing that additional information is existent is displayed instead of the additional information.

In the digital multi-functional peripheral 1 according to the present invention, during generation of a preview image, the image display portion displays a generation stop key for stopping the generation of the preview image on a setting screen so as to be selectable by a user. The setting screen here is a screen for the user to set processing conditions in accordance with output processing such as print conditions and is a setting screen that is displayed on the image display portion at a stage where acquisition of the image data or generation of a preview image is started. When the generation stop key is selected by the user operation, that is, when an instruction to stop the generation of the preview image is given by the user, the preview image generating portion 16a stops generation of the preview image and the image display portion displays a different screen (shifts the screen to a different transition screen) in accordance with a generation state of the preview image when the generation stop key is selected.

In the present invention, according to the configuration as described above, in performing a preview display of image data to be output, when a cancel of the preview display is instructed by the user operation, a different screen is displayed in accordance with a generation state of the preview image so that subsequent processing is able to be continued without returning to an initial screen depending on the screen displayed at the time. That is, according to the present invention, even during reading of a target file or forming of a preview image by a display instruction of a preview image, the preview processing is able to be stopped, and even when the preview display is stopped, by converting a screen shifted after the preview is stopped depending on the progress conditions of generation of the preview image, it is possible to shift to a screen suitable for the subsequent processing by the user and it is also possible to suppress user's uneasiness and unnecessary switching of the screen.

<Specific Example of Preview Display>

Referring to FIGS. 4 to 14, description will hereinafter be given for an exemplary display of a preview image of image data to be output and for the flow of a preview display thereof (flow involving a cancel instruction of the preview display), with specific examples thereof.

Description will be given taking a preview display in copying as an example, which is also basically the same in the case of processing in sending or in filing data other than copying processing, and there is minor differences, for example original reading is performed instead of acquiring of image data to be output from the image storage portion 15 or the outside and post processing such as staple or punch is not performed (adding of additional information is possible), thus description of which will be omitted. Further, description will be given taking the processing procedure as an example, that (I) after all of original reading is finished, generation of a preview image is started, and after all of generation of the preview image is finished, a preview display is performed. Other processing procedure thereof will be briefly described below.

Figure 4:
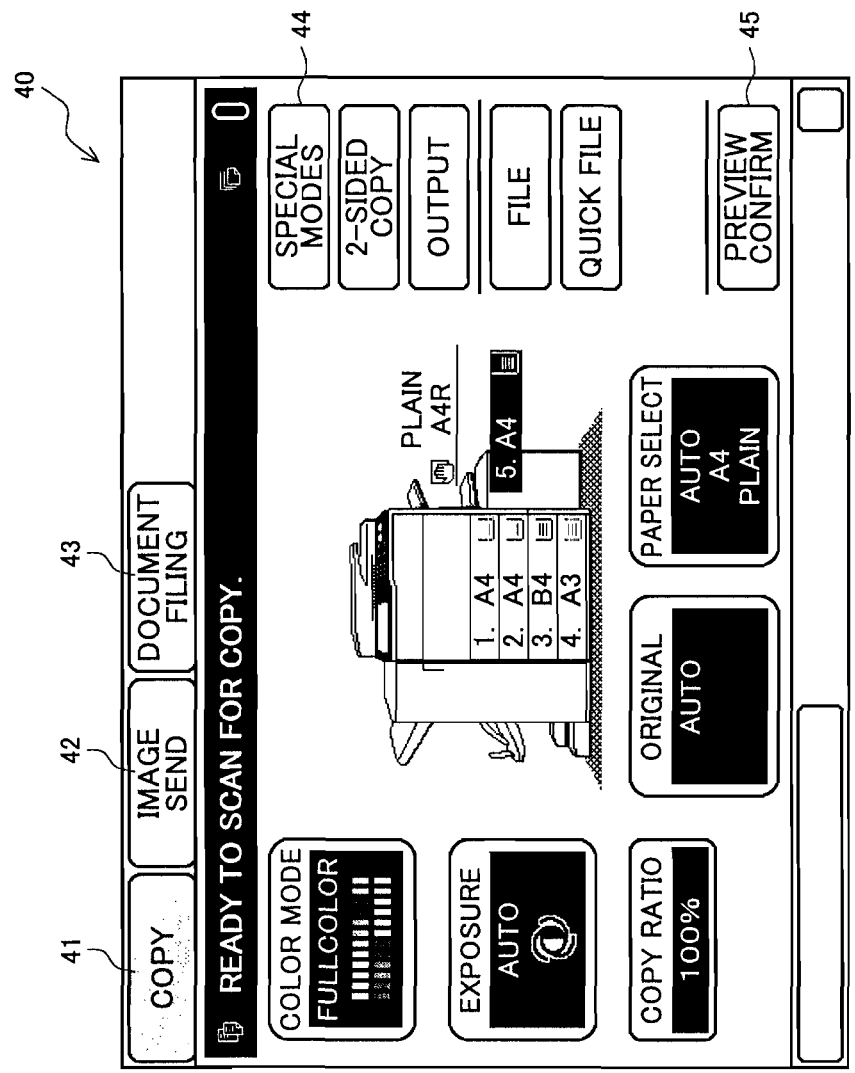
FIG. 4 is a diagram for showing an example of a standard screen of the digital multi-functional peripheral explained in FIGS. 2 and 3.

FIG. 4 is a diagram for showing an example of a standard screen of the digital multi-functional peripheral explained in FIGS. 2 and 3. FIG. 4 shows an example of a GUI image (referred to as a GUI image 40) displayed on the touch panel 32 in the digital multi-functional peripheral 1 as the standard screen. The GUI image 40 of the standard screen is displayed on the touch panel 32 when a power source of the digital multi-functional peripheral 1 is turned on or reset. In the GUI image 40, a copy mode selection key 41, an image send mode selection key 42, and a document filing mode selection key 43 are displayed to select an operation mode of the digital multi-functional peripheral 1, and the GUI image 40 shows a state where the copy mode is selected.

In the copy mode, various condition settings are possible to perform a copy. For example, a 2-sided copy key for performing a setting of 1-sided/2-sided copy, an output key for performing a setting of post processing such as punch or staple, a special modes key 44 for performing other detailed settings in copying, a preview confirm key 45 for confirming an output state of an image read by a scanner, an image input from an external device, or an image stored in a storage apparatus such as HDD, and the like are provided. Setting items of the stapling processing include a setting of an ejection direction of recoding paper, a setting of a binding position of the staple, and the like. In addition, setting items of the post processing include a setting of sorting processing, an offset setting for deciding a width to be shifted in sorting sheets to be output in an overlaid manner, a setting of saddle stitch binding, a setting of paper folding, and the like.

By operating the preview confirm key 45 using the touch panel 32, the user is able to display a preview image data. Note that, the key 42 or the key 43 is selected to shift to a data send mode (image send mode) or a filing mode (document filing mode), where a GUI image for setting in each operation mode is displayed so that various settings in accordance with each operation mode are able to be performed. Also in the GUI image of each operation mode, the preview confirm key is displayed so as to be selectable or the key for shifting to a GUI image of a lower layer in which the preview confirm key is displayed so as to be selectable is displayed so as to be selectable.

Figure 5:
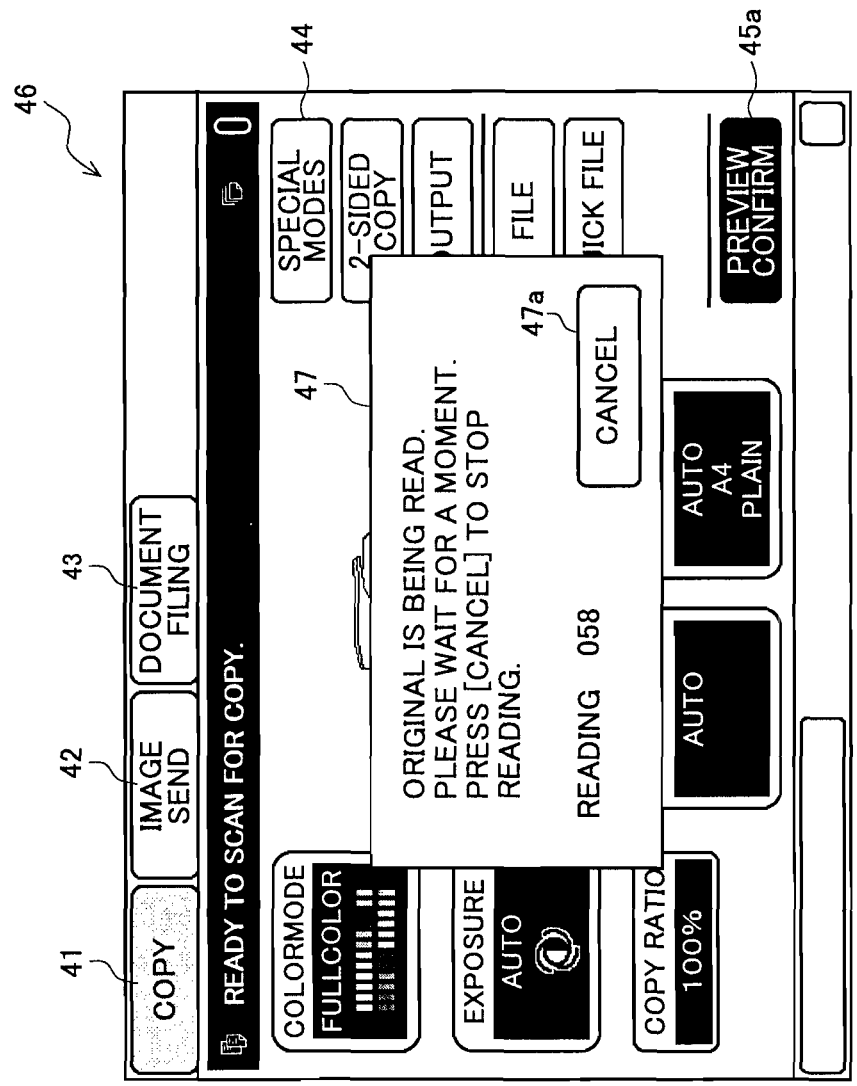
FIG. 5 is a diagram for showing an example of a screen displayed during original reading in the digital multi-functional peripheral explained in FIGS. 2 and 3.

FIG. 5 is a diagram for showing an example of a screen displayed during original reading in the digital multi-functional peripheral explained in FIGS. 2 and 3. A GUI image 46 shown in FIG. 5 is an image in which a pop-up image 47 is incorporated in the GUI image 40 of FIG. 4, and is displayed when the preview confirm key 45 is set to be turned on and reversed (to display a preview confirm key 45*a*) and a copy start button (assuming a hardware key in this example) is depressed while the GUI image 40 is displayed.

In the pop-up image 47, a cancel key 47*a* for stopping original reading is displayed so as to be selectable, and simultaneously, "the original is being read", "the cancel key needs to be pressed to stop the original reading", "the number of sheets of read originals (58 sheets in this example)", and the like are displayed. By selecting the cancel key 47*a*, it is possible to stop original reading and also to stop forming of a preview image.

Figure 6:
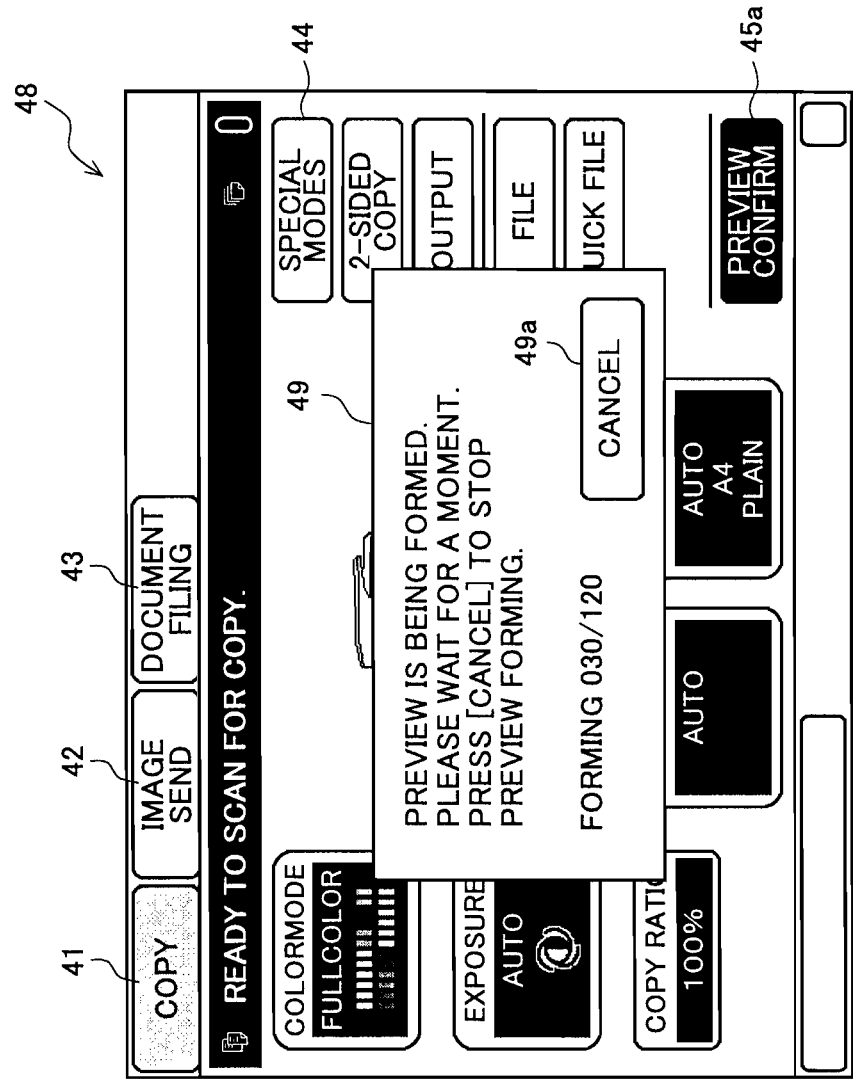
FIG. 6 is a diagram for showing an example of a screen displayed during generation of a preview image in the digital multi-functional peripheral explained in FIGS. 2 and 3.

FIG. 6 is a diagram for showing an example of a screen displayed during generation of a preview image in the digital multi-functional peripheral explained in FIGS. 2 and 3. A GUI image 48 shown in FIG. 6 shows a state where a preview image is being formed after completing original reading, in which a pop-up image 49 is displayed in a state of being overlaid on the GUI image 40 of FIG. 4 after the pop-up image 47 in the GUI image 46 of FIG. 5 is deleted.

In the pop-up image 49, a generation stop key (cancel key) 49*a* is displayed so as to be selectable, and simultaneously, "the preview is being formed", "the cancel key needs to be pressed to stop the preview forming", and the like are displayed. By selecting the cancel key 49*a*, it is possible to stop forming of a preview image. Since there is a case where it takes long time to form preview images, such as a case where there are a lot of originals to be read, the pop-up image 49 also displays the number of read sheets and the number of sheets having a preview image formed thereon (that the preview image has been formed on 30 sheets out of 120 sheets in this example). In this manner, the number of sheets of generated preview images is preferably displayed during generation of preview images by the preview image generating portion 16*a* on the touch panel 32. This makes it possible to notify the user of the forming state of the preview images.

Figure 7:
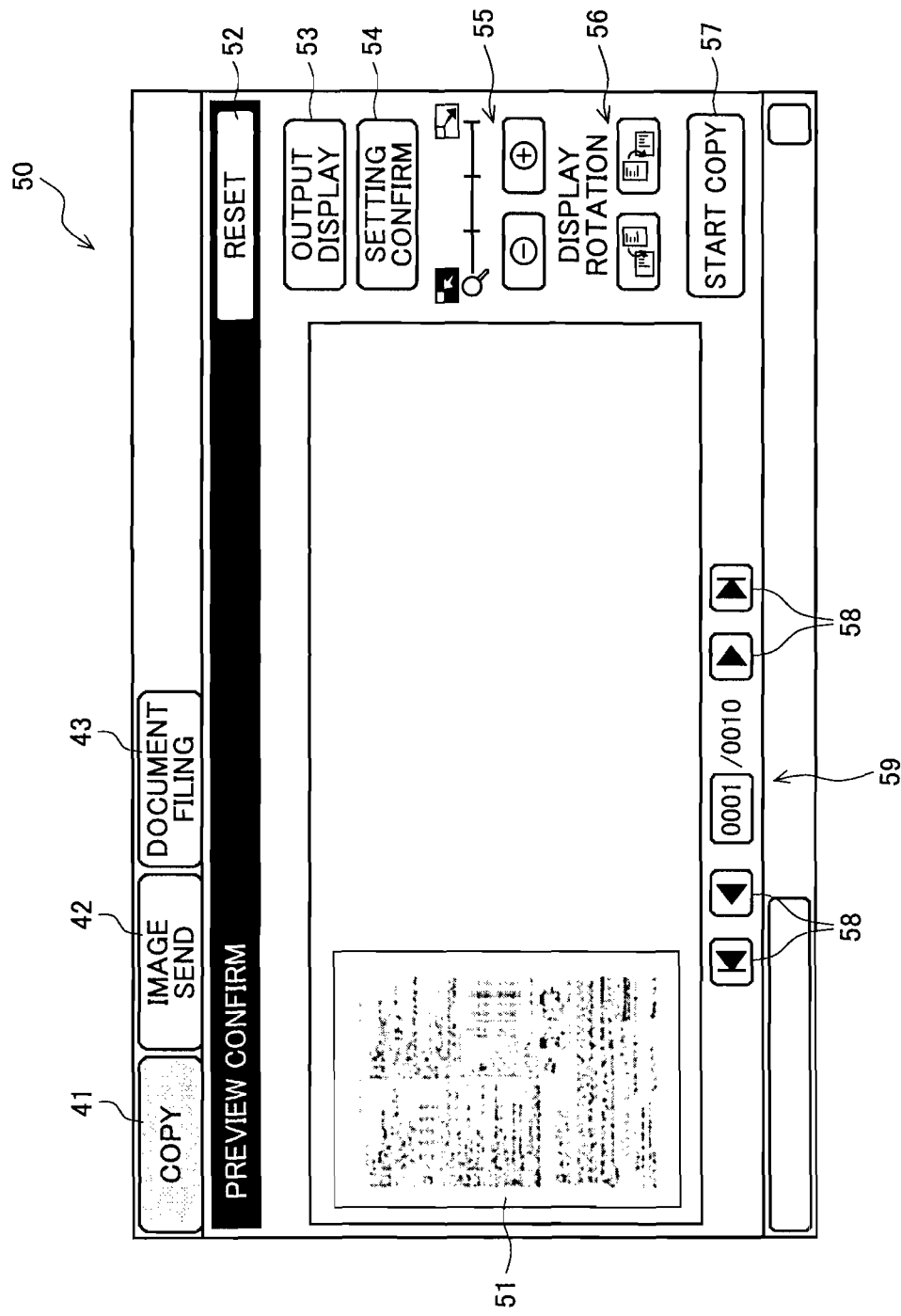
FIG. 7 is a diagram for showing an example of a preview display screen in the digital multi-functional peripheral explained in FIGS. 2 and 3.
Figure 8:
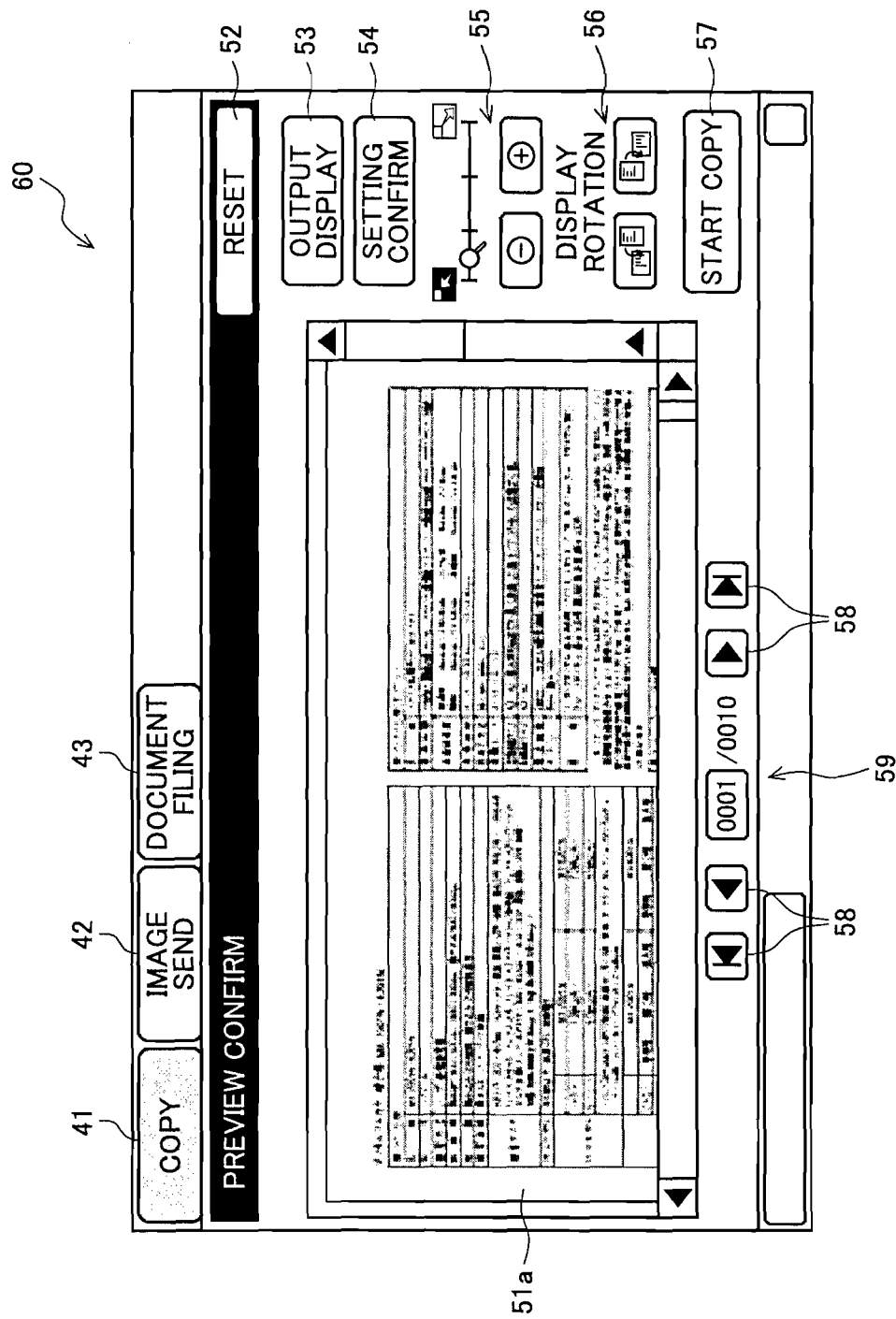
FIG. 8 is a diagram for showing an example of a preview display screen when a preview image is displayed in enlargement on the preview display screen of FIG. 7.

FIG. 7 is a diagram for showing an example of a preview display screen in the digital multi-functional peripheral explained in FIGS. 2 and 3, and FIG. 8 is a diagram for showing an example of a preview display screen when a preview image is displayed in enlargement on the preview display screen of FIG. 7.

A GUI image 50 shown in FIG. 7 is automatically displayed at a stage where preview forming is finished after the GUI image of FIG. 6 is displayed (because the preview confirm key 45*a* is set). Note that, it is also possible to display the GUI image 50 (without shifting to another screen) by selecting the preview confirm key 45 in a state where the GUI image 40 of FIG. 4 is displayed. In the GUI image 50, a preview image 51 that is generated from image data to be printed by the preview image generating portion 16*a* is displayed in a state of being incorporated in the GUI image.

Further, reduced image data is shown for each page in the preview image 51. In this manner, the preview image is preferably an image generated by reducing image data to be output. The preview image is also preferably an image in which image data to be output is successively displayed in the unit of a page to be output. That is, the display is preferably able to be performed successively in the unit of a page in the preview display. Since the display in the unit of a page is employed, information 59 indicating a current page and page switch keys are displayed at the same time on the GUI image 50 to change a page of image data displayed for previewing. The page switch keys (shift key) 58 include a top page shift key for displaying a first page, a previous page shift key for displaying a page before a current page, a next page shift key for displaying a page next to a current page, and a last page shift key for displaying a last page. The preview image 51 is displayed for each page in this manner and the user is able to display the preview image of an arbitrary page by operating the page switch keys 58 as appropriate.

Note that, since a display apparatus such as the touch panel 32 that displays a preview image has generally a small size, it is desirable that, in displaying the preview image 51 like in the GUI image 50 of FIG. 7, a reduced image is displayed so that the whole aspect of pages is able to be grasped.

In the GUI image 50, a setting confirm key 54, an enlarging/reducing key 55, display rotation keys 56, and the like are further displayed so as to be selectable, and by operating these keys as appropriate, the user is able to display a GUI image (GUI image 64 of FIG. 10 below, for example) for confirming a setting of the preview image 51 or to confirm by enlarging, reducing or rotating the preview image 51. For example, when the preview image is enlarged, an enlarged preview image 51*a* as shown in a GUI image 60 of FIG. 8 is displayed and scroll bars are displayed at the same time so that the entirety is able to be confirmed.

Moreover, in the GUI image 50 and the GUI image 60, an output display key 53 for displaying an output state (finished state) is also displayed so as to be selectable and a reset key 52 is displayed so as to be selectable. When a necessity of resetting print conditions after confirming the preview image 51 or the preview image 51*a* arises, the user is able to display a GUI image (GUI image 61 of FIG. 9 below, for example) for resetting the print conditions by operating the reset key 52. Then, it is possible to reset the print conditions using the resetting screen to display the preview image 51 or the preview image 51*a* based on the reset print conditions. In this manner, on the touch panel 32, the reset key 52 for shifting to a resetting screen to change processing conditions of output processing (that is, resetting screen to edit image data) is displayed in the preview display screen so as to be selectable so that the resetting screen is displayed when the reset key is selected by the user. In addition, a copy start key 57 is displayed so as to be selectable on the GUI image 50 and the GUI image 60, and when the user operates the copy start key 57, processing for performing image formation (printing) of the image data displayed for previewing is started.

Figure 9:
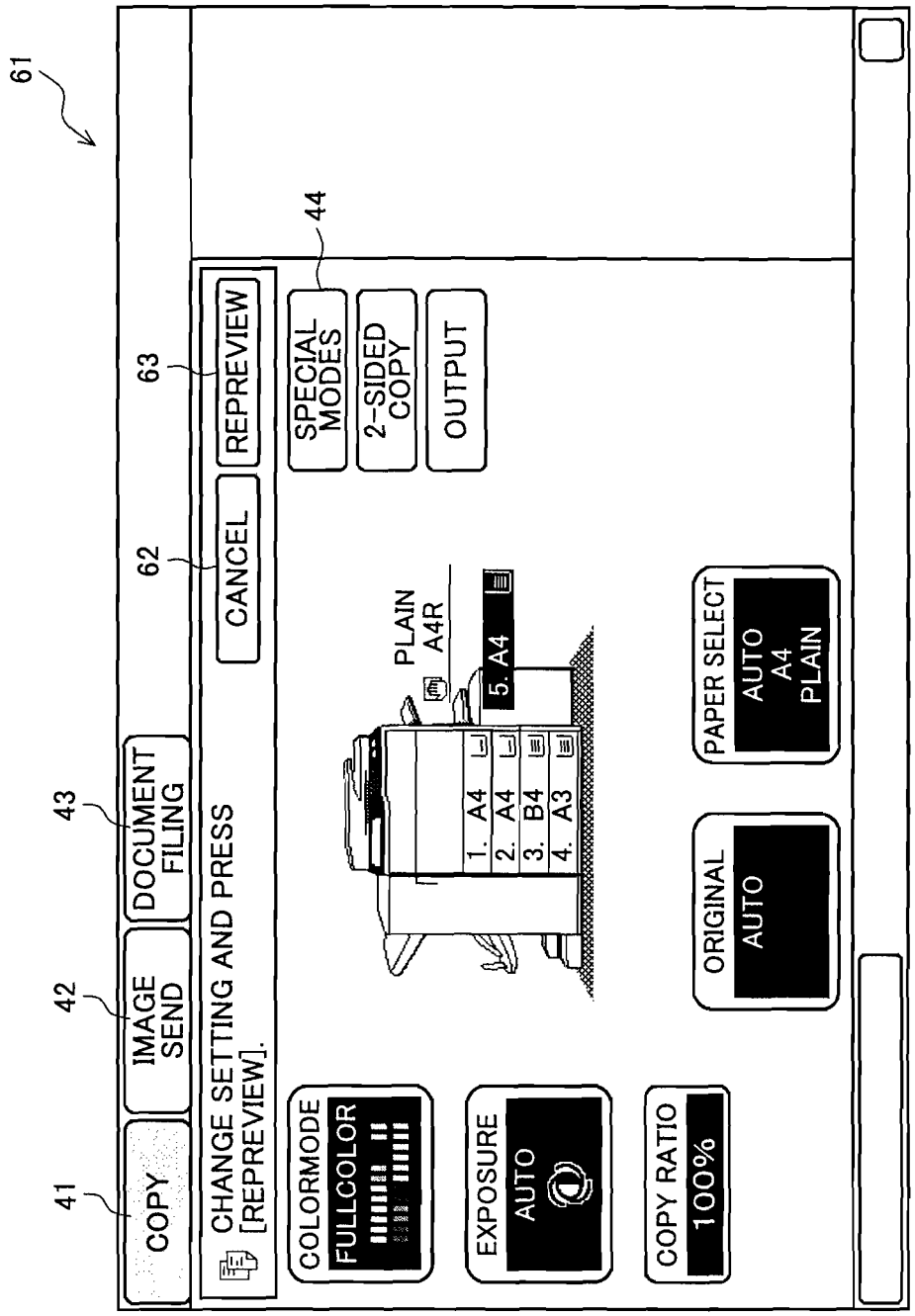
FIG. 9 is a diagram for showing an example of a resetting screen that is displayed when a reset key is selected in a GUI image of FIG. 7 or 8.

FIG. 9 is a diagram for showing an example of a resetting screen that is displayed when a reset key is selected in a GUI image of FIG. 7 or 8. The GUI image 61 in the resetting screen shown in FIG. 9 is displayed when the reset key 52 is selected in the GUI image 50 of FIG. 7 or the GUI image 60 of FIG. 8.

In the GUI image 61, a repreview key 63 for starting generation of a new preview image by the preview image generating portion 16*a* is displayed so as to be selectable and a cancel key 62 for canceling a resetting is also displayed so as to be selectable. Simultaneously, the text prompting to "change the setting and press the repreview key" is also displayed.

In the GUI image 61, a resetting of various copy conditions is able to be performed, and by selecting the repreview key 63 after the resetting, shifting is performed back to the screen before shifting to FIG. 9 (FIG. 7, 8, or 11, for example) to perform a preview display under the reset copy conditions. In this manner, when the repreview key 63 is selected by the user and generation of a new preview image is started by the preview image generating portion 16*a*, the cancel key 49*a* is preferably displayed again (displayed again by overlaying on the resetting screen or by displaying another screen and overlaying thereon). When the cancel key 49*a* is selected by the user after such a resetting, the cancel key 49*a* may be deleted to display the GUI image 61 of the resetting screen again.

Here, an example of transition between each of the screens of FIGS. 4 to 9 will be taken. As described with reference to FIGS. 5 and 6, when the preview confirm key 45 is set in the initial screen of FIG. 4 and the copy start button is then depressed, a cancel of original reading is made possible while the GUI image 46 of FIG. 5 is displayed (that is, during original reading), and a cancel of a preview display is made possible while the GUI image 48 of FIG. 6 is displayed (that is, during forming of a preview image). The case where the cancel is executed during the original reading shows the case where the user has noticed a big mistake in the copy setting just after the start of the copy, and by returning to the initial screen shown in FIG. 4 (however, the preview confirm key 45 is being not selected), the user is able to set the copy conditions from the beginning. On the other hand, the case where the cancel is executed during the forming of a preview image shows the case where the cancel is performed due to that it takes long time to form the preview image or the case where changing of copy conditions such as post processing is executed. Accordingly, in such a case, shifting is performed not to the initial screen shown in FIG. 4 but to the resetting screen shown by the GUI image 61 of FIG. 9. This makes it possible to reset the print conditions in a state where the original reading or the generation of a preview image is performed, and to continue the processing without necessity of setting the copy conditions from the beginning or reading all of the originals again.

Further, even during forming of a preview image, there are a case where preview images are not able to be formed at all and a case where several sheets of preview images are formed, depending on a timing of the cancel. Since the case where preview images are not able to be formed at all in the cancel seems to be the case where the user has noticed a mistake in the setting and desires to change the setting, it is possible to improve the convenience of the user by shifting to the resetting screen shown by the GUI image 61 of FIG. 9. On the other hand, the case where several sheets of preview images are formed in the cancel seems to be the case where the user does not need to confirm all sheets of preview images and desires sending, it is possible to confirm the several sheets of formed preview images by shifting to the GUI image 48 in which the pop-up image 49 of FIG. 6 that displays the several sheets of formed preview images. In such a state, it is also possible to start printing of the read image data, and when the several sheets of formed preview images include a destination and the like, it may be enough just to confirm the first page.

Figure 10:
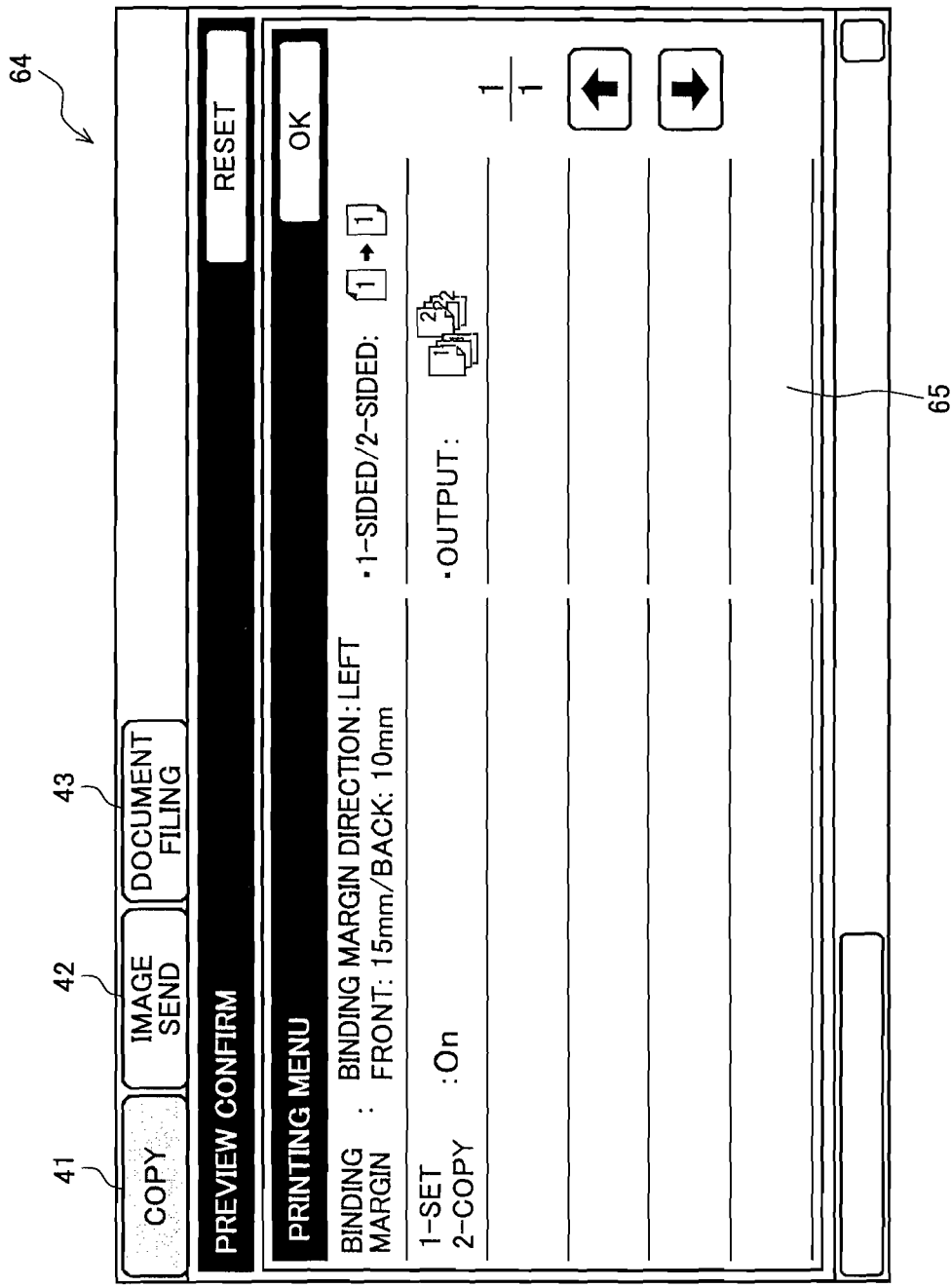
FIG. 10 is a diagram for showing an example of a setting screen that is displayed when a setting confirm key is selected in a GUI image of FIG. 7 or 8.

FIG. 10 is a diagram for showing an example of a setting screen that is displayed when a setting confirm key is selected in a GUI image of FIG. 7 or 8. The GUI image 64 of the setting screen of FIG. 10 is displayed when the setting confirm key 54 is selected in the GUI image 50 of FIG. 7 or the GUI image of FIG. 8. In the GUI image 64, an area 65 where employed print conditions are able to be confirmed is displayed and it is also possible to confirm the print conditions to reset by the reset key.

Figure 11:
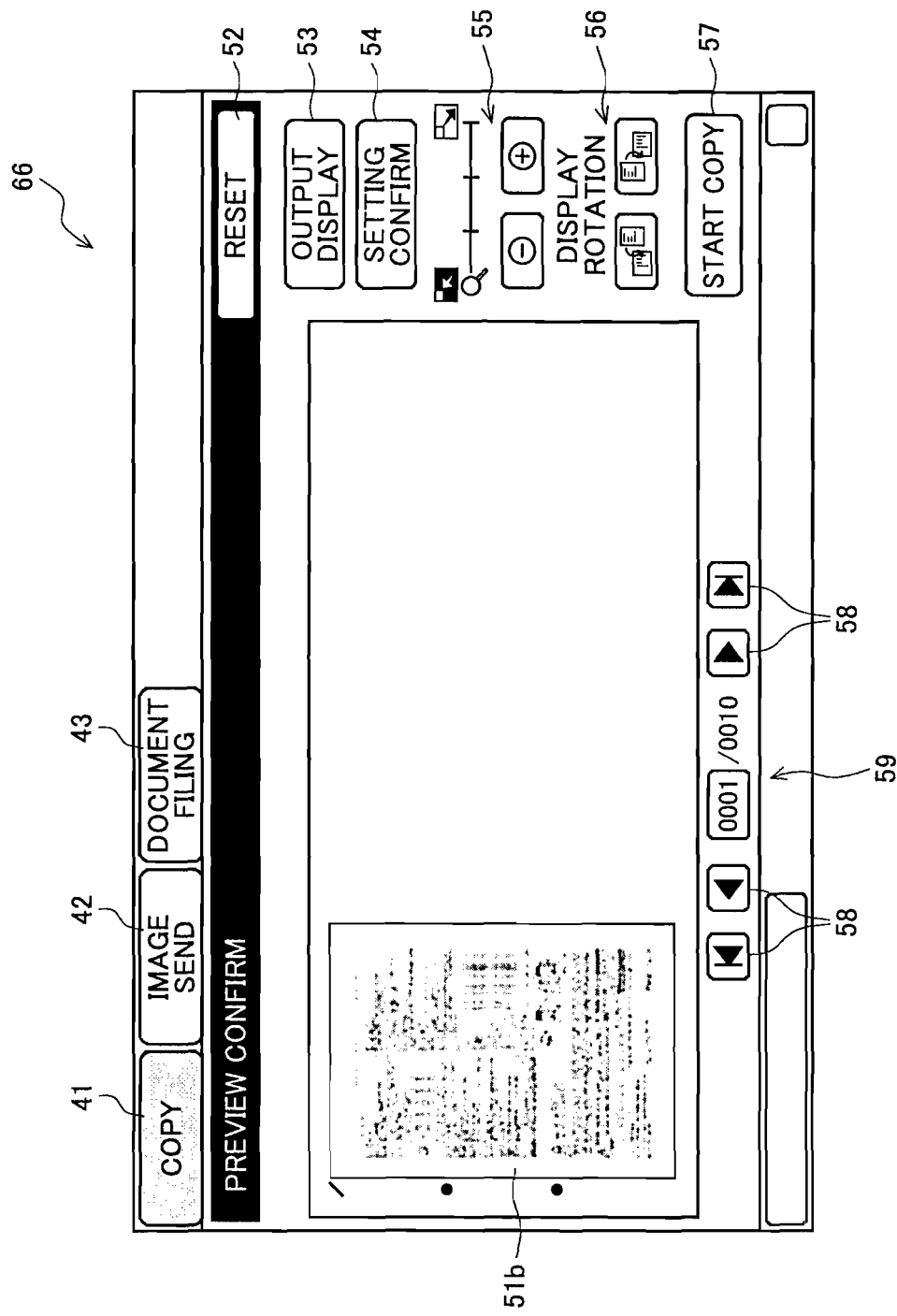
FIG. 11 is a diagram for showing an example of a preview screen that is displayed when a preview confirm key of FIG. 4 or a repreview key of FIG. 9 is selected.

FIG. 11 is a diagram for showing an example of a preview screen that is displayed when a preview confirm key of FIG. 4 or a repreview key of FIG. 9 is selected, and is also a diagram for showing an example of a preview display screen in the digital multi-functional peripheral explained in FIGS. 2 and 3.

A GUI image 66 of FIG. 11 is displayed so that finishing processing such as punch or staple is able to be confirmed by selecting the preview confirm key 45 of FIG. 4 or selecting the repreview key 63 of FIG. 9. That is, in the GUI image 66, a reduced image allowing discrimination of the finished state of the entire image is displayed as a preview image 51*b*. In this manner, the preview image is preferably displayed in a final output form of the output processing based on processing conditions. In the preview image 51*b*, a stapled image and a punched image are displayed near the processing position thereof as the finished state. The finished state includes the stapling processing, the punching processing, the integrating processing (N in 1), and the saddle stitch binding processing. Further, the output state to be confirmed also includes the addition state of additional information such as a fixed stamp, date (or date and time), a page number, and details of header to be added to a sending original. In the preview image, an image of additional information such as a top secret stamp image or a time stamp image may be displayed in an overlaid manner at an adding position in outputting as the finished state.

The GUI image 66 is also able to employ the transition to be displayed also when the output display key 53 is selected in the GUI image 50 of FIG. 7 or the GUI image 60 of FIG. 8. For example, the preview image 51 of FIG. 7 displays the entire image data, but when the user wants to apply the finishing processing such as punch and staple, the reset key 52 is selected and the resetting is performed as such in the GUI image 61 of FIG. 9 to perform a repreview. This makes it possible to confirm an arrangement form of the entire image that displays the finished state like the preview image 51*b* in the GUI image of FIG. 11.

Note that, the position of additional information as shown in FIG. 11 is generally the same as in the printing state when printing is actually executed, but may be different in the case of saddle stitch printing or the like. For example, when an image of additional information corresponding to date and time, a fixed stamp, a page number, and arbitrary text is displayed in the preview image, the additional information is printed in a state of being added on a position as it is in a print page which is on the left side of spread pages, while only additional information of date and time may be added on the same position in a print page which is on the right side and other additional information may be printed in a state of being added on symmetry positions with respect to a boundary line between the left side and the right side. Of course, even in the case of saddle stitch printing, additional information may be added on a position as it is in both a print page on the left side of spread pages and a print page on the right side thereof.

Figure 12:
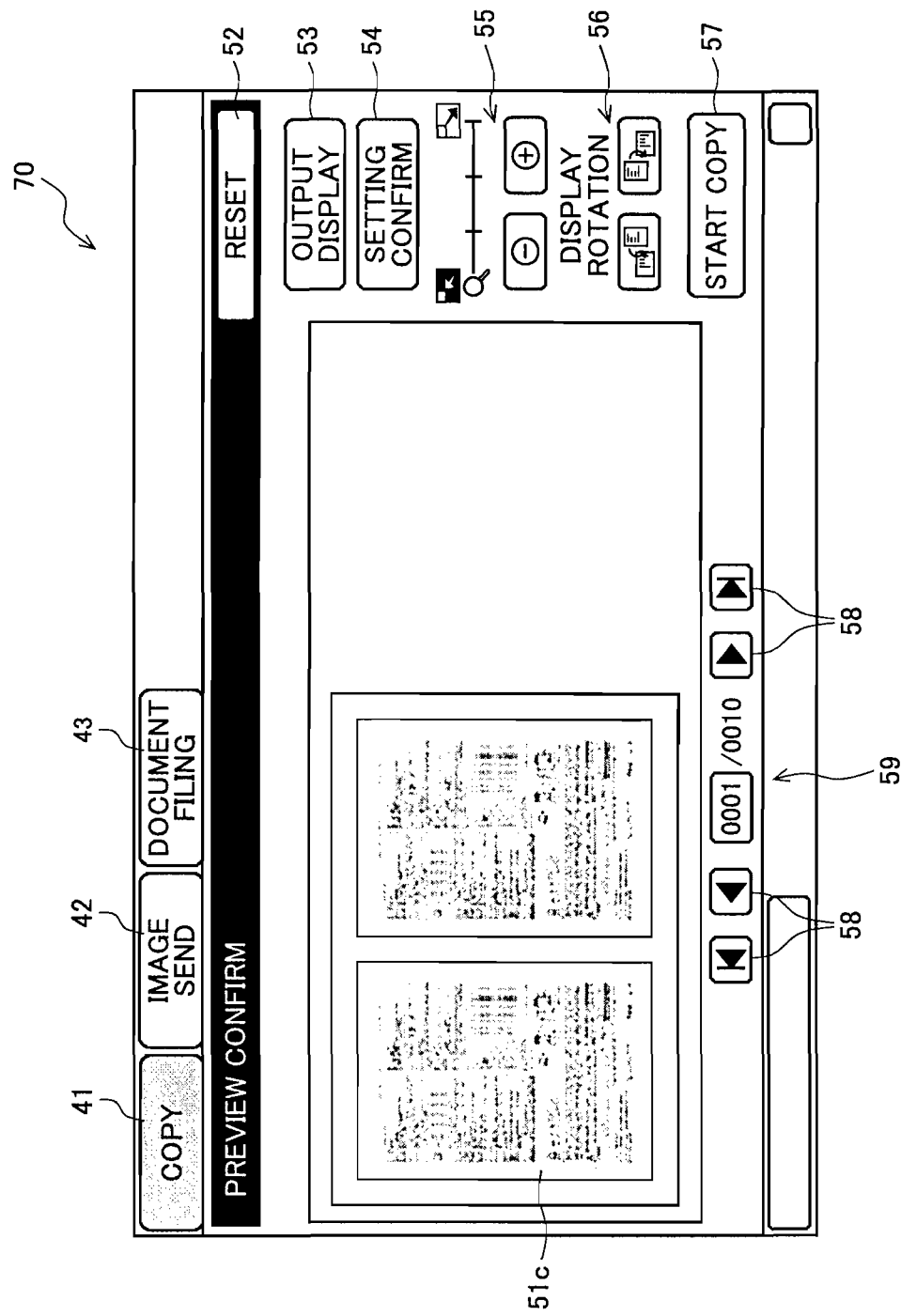
FIG. 12 is a diagram for showing another example of a preview screen that is displayed when the preview confirm key of FIG. 4 or the repreview key of FIG. 9 is selected.

FIG. 12 is a diagram for showing another example of a preview screen that is displayed when the preview confirm key of FIG. 4 or the repreview key of FIG. 9 is selected, and is also a diagram for showing another example of a preview display screen in the digital multi-functional peripheral explained in FIGS. 2 and 3. In a GUI image 70 shown in FIG. 12, a reduced image allowing discrimination of the finished state of the entire image including the integrating processing is displayed as a preview image 51c.

Further, in FIG. 12, the finished state by post processing such as punch or staple is not displayed, but when both adding processing of additional information and post processing are applied, the addition state of the additional information as well as the state of the post processing may be displayed. The GUI image 70 of FIG. 12 is also displayed when the output display key 53 is selected in the GUI image 50 of FIG. 7 or the GUI image 60 of FIG. 8.

Figure 13:
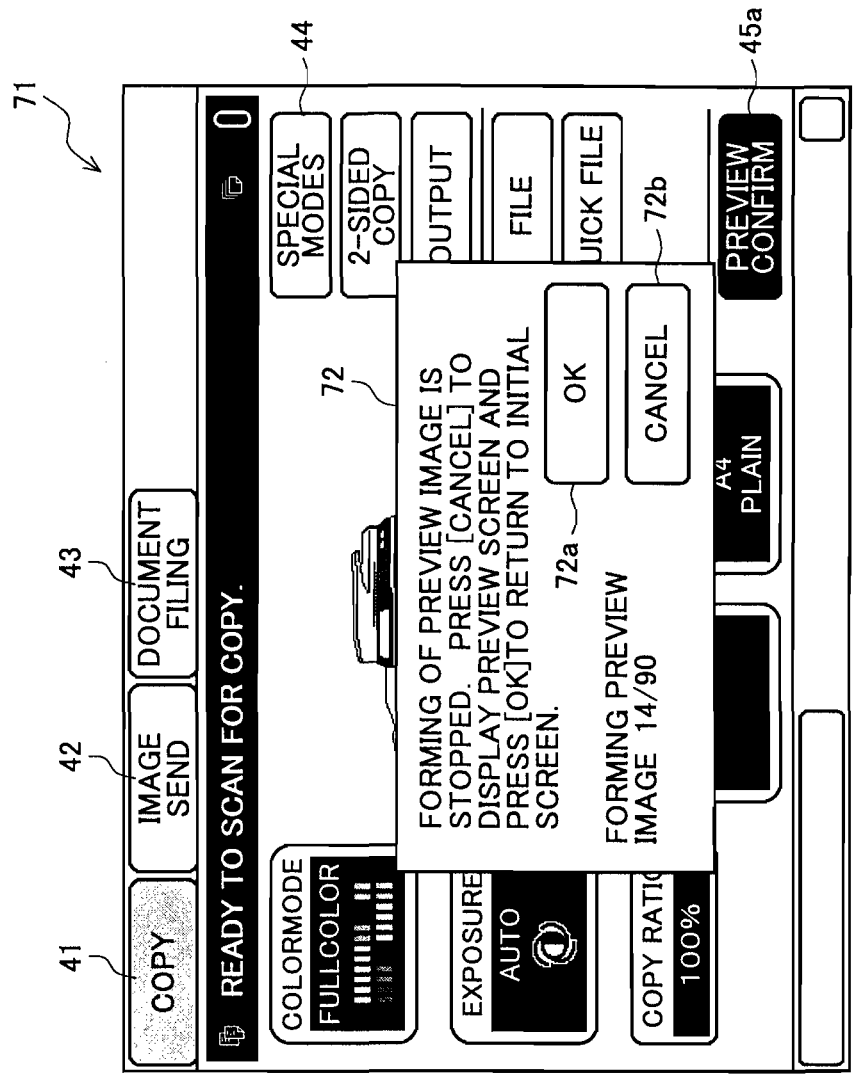
FIG. 13 is a diagram for showing an example of a setting screen that is displayed when a cancel key is selected in a GUI image of FIG. 6.

FIG. 13 is a diagram for showing an example of a setting screen that is displayed when a cancel key is selected in a GUI image of FIG. 6. A GUI image 71 shown in FIG. 13 is an image that is displayed when the cancel key 49a is selected in the GUI image 48 of FIG. 6 and is obtained by incorporating a pop-up image 72 in the GUI image 40 of FIG. 4.

In the pop-up image 72, an OK key 72a and a cancel key 72b are displayed so as to be selectable, and simultaneously, "forming of preview is stopped", "press [cancel] (key) to display a preview image", and the like are displayed. By selecting the cancel key 72b, it is possible to restart the display of the preview image and to restart the forming of the preview image as well. For example, even if generation of the preview image is not restarted, when several pages of preview images have been generated before the preview display is canceled, the preview images are able to be browsed, thus making it possible for the user to confirm the several pages of the preview images immediately.

Since there is also a case where it takes long time to form preview images, such as a case where there are a lot of originals to be read, in the case where the cancel key 49a is selected, preferably generation of preview images is seemingly canceled, but is continued as internal processing. That is, when the cancel key 49a is selected, the touch panel 32 displays that the generation of preview images is stopped, and on the other hand, the preview image generating portion 16a continues to generate the preview images without stopping the generation. This makes it possible to display a lot of preview images to be browsed immediately when the user desires to display the preview again and selects the cancel key 72b. The pop-up image 72 also displays the number of read sheets and the number of sheets having a preview image formed thereon (that the preview image has been formed on 14 sheets out of 90 sheets in this example). In this manner, when the cancel key 49a is selected, the number of sheets of preview images that have been generated by the preview image generating portion 16a (the number of sheets on which forming of the preview image has been completed) is preferably displayed on the touch panel 32. This makes it possible to notify the user of the forming state of the preview images.

Figure 14:
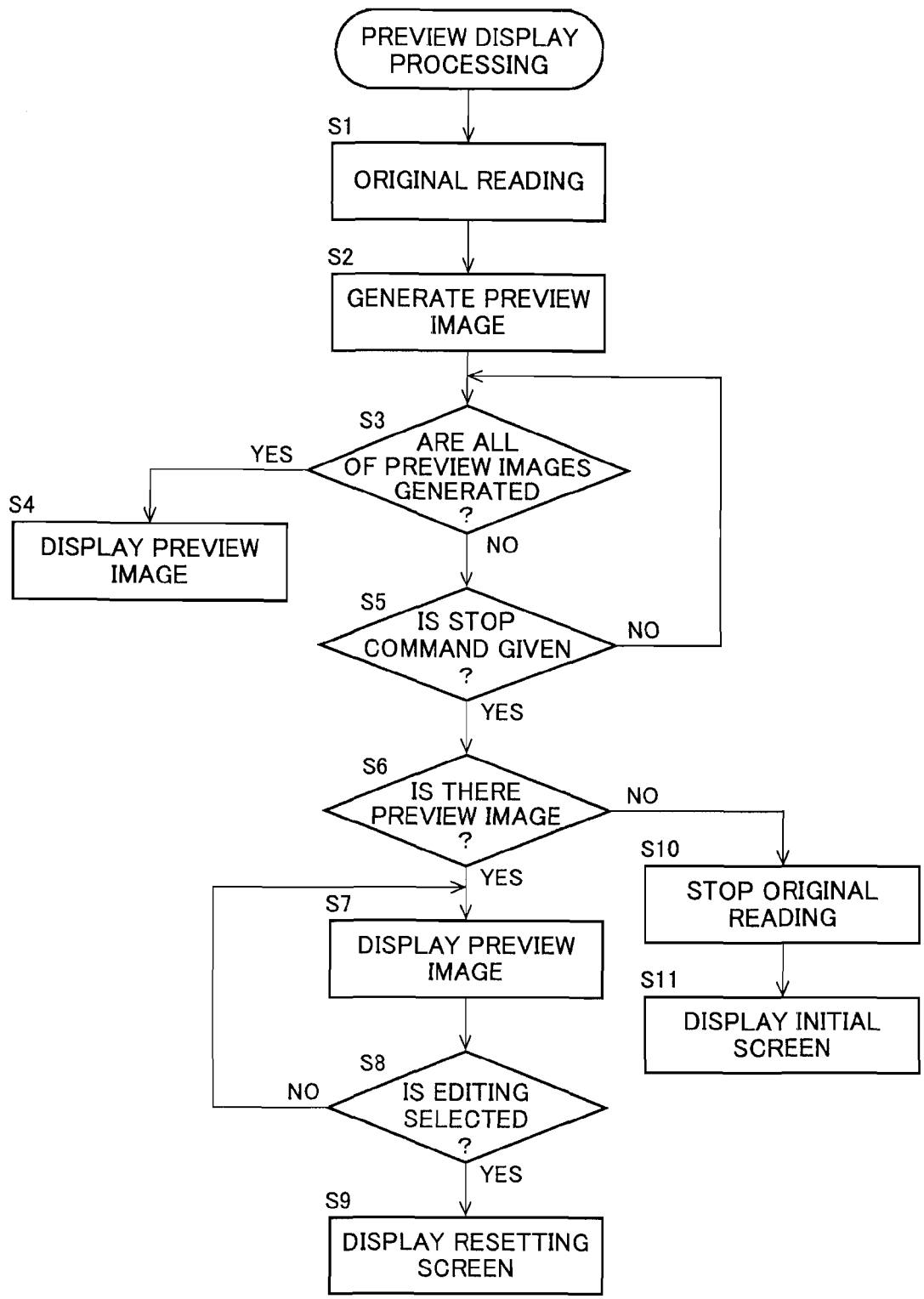
FIG. 14 is a flowchart for explaining an example of procedure for executing a preview display and printing processing for a single job in the digital multi-functional peripheral of FIGS. 2 and 3.

Next, description will be given for the flow when a preview display and printing processing are executed in the digital multi-functional peripheral 1 (flow involving a cancel instruction of a preview display) taking copy processing as an example with reference to FIG. 14. FIG. 14 is a flowchart for explaining an example of procedure for executing a preview display and printing processing for a single job in the digital multi-functional peripheral of FIGS. 2 and 3. As described above, processing other than the copy processing is also basically the same, with description of which omitted.

First, the main control portion 18 receives a print setting, instructs the reading portion 13 to read original images, and optically reads all sheets of the original images (step S1). Subsequently, the main control portion 18 controls the preview image generating portion 16a to execute generation of a preview image (step S2). Note that, the main control portion 18 determines whether a setting of the preview confirm key is performed, that is, determines whether the preview confirm key is turned on, and processing of step S2 and subsequent processing may be performed only when the setting is performed.

Then, the main control portion 18 determines whether all preview images for a current print job are generated by the preview image generating portion 16a (step S3), and controls the preview image generating portion 16a and the panel control portion 11 at the time when all of them are generated to perform generation of the preview images and the preview display on the touch panel 32 (step S4).

Subsequently, the main control portion 18 determines through the panel control portion 11 whether a stop command is received (step S5), and when the stop command is not received, the procedure returns to step S3, and when the stop command is received, it is confirmed whether or not even a single sheet of generated preview image for the print job exists (step S6)

If it is determined at step S6 to be existent, the main control portion 18 controls the preview image generating portion 16a and the panel control portion 11 to perform generation of a preview image and the preview display on the touch panel 32 (step S7). Then, the main control portion 18 determines whether or not an editing operation is selected through the panel control portion 11 (step S8), and when the editing operation is not selected, the procedure returns to step S7 to continue the preview display successively. If it is determined at step S8 as being selected, the main control portion 18 controls the preview image generating portion 16a and the panel control portion 11 to display a resetting screen like the GUI image 61 of FIG. 9 on the touch panel 32 (step S9).

Alternatively, if it is determined at step S6 to be inexistent, the main control portion 18 instructs the reading portion 13 to stop the original reading to stop the reading (step S10), and controls the preview image generating portion 16a and the panel control portion 11 to display an initial screen (initial setting screen) like the GUI image 40 of FIG. 4 on the touch panel 32 (step S11). As step S11 is executed as a determination result of step S6, if preview images are not generated at all by the preview image generating portion 16a (that is, if the number of generated sheets is zero) when the cancel key is selected, an initial setting screen which is a first screen to set processing conditions of output processing is preferably displayed on the touch panel 32.

Here, supplementary description will be given for step S10. It is assumed that step S10 is not executed actually since the procedure actually proceeds to step S2 after completion of the reading at step S1, but step S10 is described since it is executed in the processing procedure described below other than the above-described (I). Moreover, as described as the processing of step S10 after the processing of step S5, if acquisition of image data to be output is executed when the cancel key 49a is selected by the user, the acquisition (original reading in this example) is preferably stopped. As described as the processing of step S11 after the processing of step S10, an initial setting screen which is a first screen to set processing conditions of output processing is preferably displayed on the touch panel 32, when the acquisition of image data is stopped.

As in the description that the processing of step S4 and step S7 is executed as screens as determination results of step S3 and step S6, when at least a single sheet of a preview image has been generated, shifting is preferably performed to a preview display screen including the preview image. As in the description that the processing of step S7 is executed as a determination result of step S6, when at least a single preview image has been generated, the preview display screen including a preview image generated before the cancel key is selected is preferably displayed on the touch panel 32.

Although description has been given taking the processing procedure in the above-described (I) as an example with reference to FIGS. 4 to 14, it is also possible to employ the following processing procedure that: (II) after all of original reading is finished, generation of a preview image is started and a preview display is performed at the time when a sheet of the preview image is generated, (III) generation of a preview image is started at the time when original reading is started, and a preview display is performed after finishing the generation of the preview image, (IV) generation of a preview image is started at the time when original reading is started, and a preview display is performed at the time when a sheet of the preview image is generated, and the like.

In the processing procedure in the above-described (II), the GUI image 46 of FIG. 5 is displayed to perform original reading, and after all of the original reading is finished, the GUI image 48 of FIG. 6 is displayed to start generation of a preview image, and at the time when a sheet of the preview image is generated, contents of the pop-up image 49 of FIG. 6 (including a key allowing to cancel preview forming) may be displayed at the same time while the preview image 51 is displayed like in the GUI image 50 of FIG. 7, for example.

In the processing procedure in the above-described (III), at the time when original reading is started, generation of a preview image is started, while a key such as the cancel key 49a of FIG. 6 (and 47a) is displayed together in the pop-up image 47 in the GUI image 46 of FIG. 5 and after finishing the generation of the preview image, the preview image 51 is displayed like in the GUI image 50 of FIG. 7. In the processing procedure in the above-described (IV), at the time when original reading is started, generation of a preview image is started, while a key such as the cancel key 49a of FIG. 6 is displayed together in the pop-up image 47 in the GUI image 46 of FIG. 5, and at the time when a sheet of the preview image is generated, the preview image 51 is displayed like in the GUI image 50 of FIG. 7 and the cancel key 49a (and 47a) is displayed at the same time.

In the processing procedure in the above-described (III) and (IV), processing of reading an original image and processing of generating a preview image are executed in parallel. Such parallel processing makes it possible to shorten the time until the preview image has been generated after original reading was started. In this case, the number of sheets in which reading has been finished and the number of sheets on which the preview image has been generated may be displayed side by side. This makes it possible for the user to recognize the progress degree of both processing easily.

Although description has been given for the image processing apparatus according to the present invention with reference to the digital multi-functional peripheral 1, as described in the flow of processing thereof, the present invention may also employ a form as a preview display method in the image processing apparatus (illustrated as the above-described digital multi-functional peripheral 1). The digital multi-functional peripheral 1 is provided with the preview image generating portion and the image display portion as described above.

The preview display method according to the present invention is provided with: a step in which a preview image generating portion generates a preview image of image data to be output in the unit of an output job; a step in which an image display portion displays the preview image generated by the preview image generating portion; a step in which the image display portion displays a generation stop key for stopping generation of the preview image during the generation of the preview image so as to be selectable by a user; a step in which the preview image generating portion stops the generation of the preview image when the generation stop key is selected by a user operation; and a step in which, when the generation stop key is selected by the user operation, the image display portion displays a different screen in accordance with a generation state of the preview image when being selected. Note that, an application example of the preview display method is as described in the preview display processing in the digital multi-functional peripheral 1, with description thereof omitted.

According to the present invention, the following effects may be obtained.

According to the present invention, in performing a preview display of image data to be output, when a cancel of the preview display is instructed by a user operation, a different screen is displayed in accordance with a generation state of a preview image so that subsequent processing is able to be continued depending on a screen displayed at the time.

The invention claimed is:

1. An image processing apparatus, comprising:
a preview image generating portion for generating a preview image of image data to be output by the image processing apparatus; and
an image display portion for displaying the preview image generated by the preview image generating portion, the image display portion also displaying a generation stop key for stopping generation of the preview image during generation of the preview image so as to be selectable by a user operation, and
wherein when the generation stop key is selected by the user operation, the preview image generating portion stops generation of the preview image, and the image display portion displays a different screen in accordance with a generation state of the preview image when the generation stop key is selected,
if at least one sheet of the preview image is generated, then the different screen is a preview display screen that includes the preview image generated before the generation stop key is selected, and
if the preview image is not generated at all, then the different screen is a first screen used to set processing conditions of output processing.

2. The image processing apparatus as defined in claim 1, wherein
the image display portion displays a reset key for shifting to a resetting screen to change processing conditions of output processing on the preview display screen so as to be selectable, and displays the resetting screen when the reset key is selected by the user.

3. The image processing apparatus as defined in claim 2, wherein
the resetting screen includes a repreview key for starting generation of a new preview image by the preview image generating portion.

4. The image processing apparatus as defined in claim 3, wherein
when the repreview key is selected by the user and generation of the new preview image is started by the preview image generating portion, the generation stop key is displayed again, and when the generation stop key is selected by the user, the generation stop key is deleted and the resetting screen is displayed again.

5. The image processing apparatus as defined in claim 1, wherein in case acquisition of the image data to be output is executed when the generation stop key is selected by the user, the acquisition is stopped.

6. The image processing apparatus as defined in claim 5, wherein when the acquisition is stopped, the image display portion displays the initial setting screen that is the first screen to set processing conditions of output processing.

7. The image processing apparatus as defined in claim 1, wherein the image display portion displays the number of sheets of the generated preview image while the preview image is generated by the preview image generating portion.

8. The image processing apparatus as defined in claim 1, wherein the image display portion displays the number of sheets of the preview image that has been generated by the preview image generating portion when the generation stop key is selected.

9. The image processing apparatus as defined in claim 1, wherein when the generation stop key is selected, the image display portion displays that generation of the preview image is stopped, while the preview image generating portion continues generation without stopping generation of the preview image.

10. The image processing apparatus as defined in claim 1, wherein the preview image is an image generated by reducing the image data to be output.

11. The image processing apparatus as defined in claim 1, wherein the preview image is an image that sequentially displays the image data to be output in the unit of a page to be output.

12. The image processing apparatus as defined in claim 1, wherein the preview image is displayed in a final output form.

13. A preview display method in an image processing apparatus that includes a preview image generating portion and an image display portion, comprising:

a step in which the preview image generating portion generates a preview image of image data to be output by the image processing apparatus;

a step in which the image display portion displays the preview image generated by the preview image generating portion;

a step in which the image display portion displays a generation stop key for stopping generation of the preview image during the generation of the preview image so as to be selectable by a user; and a step in which, when the generation stop key is selected by a user operation, the preview image generating portion stops generation of the preview image, and the image display portion displays a different screen in accordance with a generation state of the preview image when the generation stop key is selected, wherein if at least one sheet of the preview image is generated, then the different screen is a preview display screen that includes the preview image generated before the generation stop key is selected, and if the preview image is not generated at all, then the different screen is a first screen used to set processing conditions of output processing.

* * * * *